US009766057B1

United States Patent
Coley et al.

(10) Patent No.: US 9,766,057 B1
(45) Date of Patent: Sep. 19, 2017

(54) CHARACTERIZATION OF A SCENE WITH STRUCTURED LIGHT

(71) Applicant: Amazon Technologies, Inc., Seattle, WA (US)

(72) Inventors: Christopher Coley, Morgan Hill, CA (US); Jonathan Betts-LaCroix, W. Hollywood, CA (US); William Spencer Worley, III, Half Moon Bay, CA (US)

(73) Assignee: Amazon Technologies, Inc., Seattle, WA (US)

( * ) Notice: Subject to any disclaimer, the term of this patent is extended or adjusted under 35 U.S.C. 154(b) by 302 days.

(21) Appl. No.: 14/500,627

(22) Filed: Sep. 29, 2014

Related U.S. Application Data

(62) Division of application No. 12/977,924, filed on Dec. 23, 2010, now Pat. No. 8,845,107.

(51) Int. Cl.
| | | |
|---|---|---|
| *G01B 11/14* | (2006.01) | |
| *G01B 11/02* | (2006.01) | |
| *H04N 7/18* | (2006.01) | |
| *G06T 19/00* | (2011.01) | |
| *G03B 21/14* | (2006.01) | |

(52) U.S. Cl.
CPC ............ *G01B 11/14* (2013.01); *G01B 11/022* (2013.01); *G03B 21/147* (2013.01); *G06T 19/006* (2013.01); *H04N 7/18* (2013.01)

(58) Field of Classification Search
CPC ...... G03B 21/13; G03B 21/26; G03B 21/147; G03B 21/206; G03B 21/2053; H04N 9/3185; H04N 9/3194; H04N 13/0475; H04N 13/0477; H04N 13/0495; G06T 2219/012; G06T 2219/2004
See application file for complete search history.

(56) References Cited

U.S. PATENT DOCUMENTS

| | | |
|---|---|---|
| 3,835,245 A | 9/1974 | Pieters |
| 3,840,699 A | 10/1974 | Bowerman |
| 4,112,463 A | 9/1978 | Kamin |
| 5,704,836 A | 1/1998 | Norton et al. |

(Continued)

FOREIGN PATENT DOCUMENTS

| | | |
|---|---|---|
| WO | WO2009112585 | 9/2009 |
| WO | WO2011088053 A2 | 7/2011 |
| WO | WO2011/115623 | 9/2011 |

OTHER PUBLICATIONS

Office action for U.S. Appl. No. 12/982,519, mailed on May 27, 2016, Worley III, "Complementing Operation of Display Devices in an Augmented Reality Environment", 27 pages.

(Continued)

*Primary Examiner* — Sultan Chowdhury
(74) *Attorney, Agent, or Firm* — Lee & Hayes, PLLC

(57) ABSTRACT

Objects and their placement within a particular scene may be characterized using structured light with no or minimal manual intervention or calibration to the scene. The structured light pattern may be rendered with visible light, yet imperceptible to users, by generating a set of opposing excursions in one or more image properties for durations which are shorter than the integration time of the human eye. A set of assumptions and ongoing testing of those assumptions against physical objects identified within the environment allows characterization of the scene and the objects therein.

20 Claims, 22 Drawing Sheets

(56) References Cited

U.S. PATENT DOCUMENTS

| | | |
|---|---|---|
| 5,946,209 A | 8/1999 | Eckel et al. |
| 6,059,576 A | 5/2000 | Brann |
| 6,098,091 A | 8/2000 | Kisor |
| 6,503,195 B1 | 1/2003 | Keller et al. |
| 6,618,076 B1 | 9/2003 | Sukthankar et al. |
| 6,690,618 B2 | 2/2004 | Tomasi et al. |
| 6,760,045 B1 | 7/2004 | Quinn et al. |
| 6,789,903 B2 | 9/2004 | Parker et al. |
| 6,803,928 B2 | 10/2004 | Bimber et al. |
| 6,811,267 B1 | 11/2004 | Allen et al. |
| 7,046,214 B2 | 5/2006 | Ebersole, Jr. et al. |
| 7,134,756 B2 | 11/2006 | Drucker et al. |
| 7,168,813 B2 | 1/2007 | Wong et al. |
| 7,315,241 B1 | 1/2008 | Daily et al. |
| 7,418,392 B1 | 8/2008 | Mozer et al. |
| 7,538,764 B2 | 5/2009 | Salomie |
| 7,720,683 B1 | 5/2010 | Vermeulen et al. |
| 7,743,348 B2 | 6/2010 | Robbins et al. |
| 7,774,204 B2 | 8/2010 | Mozer et al. |
| 7,834,846 B1 * | 11/2010 | Bell ............... G06F 3/011 345/156 |
| 7,911,444 B2 | 3/2011 | Yee |
| 7,925,996 B2 | 4/2011 | Hofmeister et al. |
| 7,949,148 B2 | 5/2011 | Rhoads et al. |
| 7,991,220 B2 | 8/2011 | Nagai et al. |
| 8,107,736 B2 | 1/2012 | Brown et al. |
| 8,159,739 B2 | 4/2012 | Woodgate et al. |
| 8,199,966 B2 | 6/2012 | Guven et al. |
| 8,253,746 B2 | 8/2012 | Geisner et al. |
| 8,255,829 B1 | 8/2012 | McCormick et al. |
| 8,264,536 B2 | 9/2012 | McEldowney |
| 8,284,205 B2 | 10/2012 | Miller et al. |
| 8,285,256 B2 | 10/2012 | Gupta et al. |
| 8,307,388 B2 | 11/2012 | Igoe et al. |
| 8,308,304 B2 | 11/2012 | Jung et al. |
| 8,356,254 B2 | 1/2013 | Dennard et al. |
| 8,382,295 B1 | 2/2013 | Kim et al. |
| 8,408,720 B2 | 4/2013 | Nishigaki et al. |
| 8,591,039 B2 | 11/2013 | Morrison et al. |
| 8,723,787 B2 | 5/2014 | Jung et al. |
| 8,743,145 B1 | 6/2014 | Price |
| 2001/0049713 A1 | 12/2001 | Arnold et al. |
| 2001/0056574 A1 | 12/2001 | Richards |
| 2002/0001044 A1 | 1/2002 | Villamide |
| 2002/0070278 A1 | 6/2002 | Hung et al. |
| 2002/0078169 A1 | 6/2002 | French et al. |
| 2002/0168069 A1 | 11/2002 | Tehranchi et al. |
| 2003/0012425 A1 * | 1/2003 | Suzuki ............... G02B 27/0093 382/154 |
| 2003/0156306 A1 | 8/2003 | Kitamura |
| 2004/0046736 A1 | 3/2004 | Pryor et al. |
| 2004/0114581 A1 | 6/2004 | Hans et al. |
| 2004/0190716 A1 | 9/2004 | Nelson |
| 2004/0201823 A1 | 10/2004 | Raskar et al. |
| 2005/0081164 A1 | 4/2005 | Hama et al. |
| 2005/0099432 A1 | 5/2005 | Chavis et al. |
| 2005/0110964 A1 | 5/2005 | Bell et al. |
| 2005/0128196 A1 | 6/2005 | Popescu et al. |
| 2005/0254683 A1 | 11/2005 | Schumann et al. |
| 2005/0264555 A1 | 12/2005 | Zhou et al. |
| 2005/0276444 A1 | 12/2005 | Zhou et al. |
| 2005/0288078 A1 | 12/2005 | Cheok et al. |
| 2005/0289590 A1 | 12/2005 | Cheok et al. |
| 2006/0028400 A1 | 2/2006 | Lapstun et al. |
| 2006/0041926 A1 | 2/2006 | Istvan et al. |
| 2006/0080408 A1 | 4/2006 | Istvan et al. |
| 2006/0152803 A1 | 7/2006 | Provitola |
| 2006/0170880 A1 | 8/2006 | Dambach et al. |
| 2006/0218503 A1 | 9/2006 | Matthews et al. |
| 2006/0248441 A1 | 11/2006 | Baumert et al. |
| 2006/0262140 A1 | 11/2006 | Kujawa et al. |
| 2007/0005747 A1 | 1/2007 | Batni et al. |
| 2007/0024644 A1 | 2/2007 | Bailey |
| 2007/0236502 A1 | 10/2007 | Huang et al. |
| 2007/0239211 A1 | 10/2007 | Lorincz et al. |
| 2007/0260669 A1 | 11/2007 | Neiman et al. |
| 2008/0094588 A1 | 4/2008 | Cole et al. |
| 2008/0151195 A1 | 6/2008 | Pacheco et al. |
| 2008/0174735 A1 | 7/2008 | Quach et al. |
| 2008/0180640 A1 | 7/2008 | Ito |
| 2008/0186255 A1 | 8/2008 | Cohen et al. |
| 2008/0229318 A1 | 9/2008 | Franke |
| 2008/0273754 A1 | 11/2008 | Hick et al. |
| 2008/0301175 A1 | 12/2008 | Applebaum et al. |
| 2008/0320482 A1 | 12/2008 | Dawson et al. |
| 2009/0031221 A1 | 1/2009 | Hookham-Miller |
| 2009/0066805 A1 | 3/2009 | Fujiwara et al. |
| 2009/0073034 A1 | 3/2009 | Lin |
| 2009/0132953 A1 | 5/2009 | Reed, Jr. et al. |
| 2009/0168027 A1 * | 7/2009 | Dunn .................. G03B 21/26 353/28 |
| 2009/0184888 A1 | 7/2009 | Chen et al. |
| 2009/0323097 A1 | 12/2009 | Iizuka |
| 2010/0011637 A1 | 1/2010 | Zhang |
| 2010/0026479 A1 | 2/2010 | Tran |
| 2010/0039568 A1 | 2/2010 | Tchoukaleysky |
| 2010/0060723 A1 | 3/2010 | Kimura et al. |
| 2010/0066676 A1 | 3/2010 | Kramer et al. |
| 2010/0164990 A1 | 7/2010 | Van Doorn |
| 2010/0199232 A1 | 8/2010 | Mistry et al. |
| 2010/0207872 A1 | 8/2010 | Chen et al. |
| 2010/0228632 A1 | 9/2010 | Rodriguez |
| 2010/0240455 A1 | 9/2010 | Gagner et al. |
| 2010/0253541 A1 | 10/2010 | Seder et al. |
| 2010/0257252 A1 | 10/2010 | Dougherty et al. |
| 2010/0281095 A1 | 11/2010 | Wehner et al. |
| 2010/0284055 A1 | 11/2010 | Kothari et al. |
| 2010/0322469 A1 | 12/2010 | Sharma |
| 2011/0010222 A1 | 1/2011 | Choudhary et al. |
| 2011/0012925 A1 | 1/2011 | Luo |
| 2011/0050885 A1 | 3/2011 | McEldowney |
| 2011/0061100 A1 | 3/2011 | Mattila et al. |
| 2011/0072047 A1 | 3/2011 | Wang et al. |
| 2011/0080475 A1 * | 4/2011 | Lee .................. G06F 3/017 348/77 |
| 2011/0087731 A1 | 4/2011 | Wong et al. |
| 2011/0093094 A1 | 4/2011 | Goyal et al. |
| 2011/0096844 A1 | 4/2011 | Poupel et al. |
| 2011/0098056 A1 | 4/2011 | Rhoads et al. |
| 2011/0134204 A1 | 6/2011 | Rodriguez et al. |
| 2011/0154350 A1 | 6/2011 | Doyle et al. |
| 2011/0161912 A1 | 6/2011 | Eteminan et al. |
| 2011/0164163 A1 | 7/2011 | Bilbrey et al. |
| 2011/0178942 A1 | 7/2011 | Watters et al. |
| 2011/0197147 A1 | 8/2011 | Fai |
| 2011/0202847 A1 | 8/2011 | Dimitrov |
| 2011/0216090 A1 | 9/2011 | Woo et al. |
| 2011/0238751 A1 | 9/2011 | Belimpasakis et al. |
| 2011/0249197 A1 | 10/2011 | Sprowl et al. |
| 2011/0289308 A1 | 11/2011 | Sobko et al. |
| 2012/0009874 A1 | 1/2012 | Kiukkonen et al. |
| 2012/0120296 A1 | 5/2012 | Roberts et al. |
| 2012/0124245 A1 | 5/2012 | Reeves et al. |
| 2012/0127320 A1 | 5/2012 | Balogh |
| 2012/0130513 A1 | 5/2012 | Hao et al. |
| 2012/0223885 A1 | 9/2012 | Perez |
| 2012/0306878 A1 | 12/2012 | Wang et al. |
| 2013/0235354 A1 | 9/2013 | Kilcher et al. |
| 2013/0300637 A1 | 11/2013 | Smits et al. |
| 2014/0125649 A1 | 5/2014 | Carlin |

OTHER PUBLICATIONS

Office action for U.S. Appl. No. 12/978,800, mailed on Jan. 5, 2016, Worley III et al., "Integrated Augmented Reality Environment", 62 pages.

Office action for U.S. Appl. No. 12/982,519, mailed on Dec. 31, 2015, Worley III, "Complementing Operation of Display Devices in an Augmented Reality Environment", 26 pages.

Office action for U.S. Appl. No. 14/498,590 mailed on Oct. 7, 2015, Worley III et al., "Powered Augmented Reality Projection Accessory Display Device", 7 pages.

(56) References Cited

OTHER PUBLICATIONS

Office action for U.S. Appl. No. 12/982,519, mailed on Jul. 23, 2015, Worley III, "Complementing Operation of Devices in an Augmented Reality Environment", 18 pages.
Office action for U.S. Appl. No. 12/978,800, mailed on Aug. 27, 2015, Worley III et al., "Integrated Augmented Environment", 51 pages.
Office action for U.S. Appl. No. 12/982,457, mailed on Sep. 10, 2015, Worley III, "Utilizing Content Output Devices in an Augmented Reality Environment", 77 pages.
Office Action for U.S. Appl. No. 12/982,519, mailed on Mar. 5, 2015, William Spencer Worley III, "Complementing Operation of Display Devices in an Augmented Reality Environment", 13 pages.
Final Office Action for U.S. Appl. No. 12/982,457, mailed on Apr. 8, 2015, William Spencer Worley III, "Utilizing Content Output Devices in an Augmented Reality Environment", 64 pages.
Office action for U.S. Appl. No. 12/978,800, mailed on Aug. 24, 2016, Worley III et al., "Integrated Augmented Reality Environment", 75 pages.
Foscam User Manual, Model:F19821W, retrieved at <<http://foscam.us/downloads/F19821W%20user%20manual.pdf>>, May 2010, pp. 45-46 (71 pages).
Office action for U.S. Appl. No. 12/982,519, mailed on Feb. 7, 2013, Worley III , "Complementing Operation of Display Devices in an Augmented Reality Environment", 13 pages.
Office Action for U.S. Appl. No. 12/977,949, mailed on Jan. 22, 2014, William Spencer Worley III, "Powered Augmented Reality Projection Accessory Display Device", 11 pages.
Office Action for U.S. Appl. No. 12/975,175, mailed on Oct. 1, 2014, William Spencer Worley III, "Designation of Zones of Interest Within an Augmented Reality Environment", 36 pages.
Office action for U.S. Appl. No. 12/977,760, mailed on Oct. 15, 2012, Worley III et al., "Generation and Modulation of Non-Visible Structured Light ", 13 pages.
Office Action for U.S. Appl. No. 12/977,760, mailed on Oct. 16, 2014, William Spencer Worley III, "Generation and Modulation of Non-Visible Structured Light", 11 pages.
Office Action for U.S. Appl. No. 13/236,294, mailed on Oct. 22, 2014, Christopher Coley, "Optical Interference Mitigation", 20 pages.
Office Action for U.S. Appl. No. 12/978,800, mailed on Oct. 25, 2013, William Spencer Worley III, "Integrated Augmented Reality Environment", 36 pages.
Office action for U.S. Appl. No. 12/982,457, mailed on Oct. 8, 2014, Worley III et al., "Utilizing Content Output Devices in an Augmented Reality Environment", 62 pages.
Office action for U.S. Appl. No. 12/977,924, mailed on Nov. 15, 2013, Coley, et al., "Characterization of a Scene With Structured Light", 9 pages.
Office Action for U.S. Appl. No. 13/236,294, mailed on Nov. 7, 2013, Christopher Coley, "Optical Interference Mitigation", 12 pages.
Office Action for U.S. Appl. No. 12/978,800, mailed on Dec. 2, 2014, William Spencer Worley III, "Integrated Augmented Reality Environment", 46 pages.
Office Action for U.S. Appl. No. 12/982,457, mailed on Dec. 3, 2013, William Spencer Worley III, "Utilizing Content Output Devices in an Augmented Reality Environment", 56 pages.
Office Action for U.S. Appl. No. 12/982,519, mailed on Feb. 12, 2014, William Spencer Worley III, "Complementing Operation of Display Devices in an Augmented Reality Environment", 12 pages.
Final Office Action for U.S. Appl. No. 13/236,294, mailed on Mar. 13, 2014, Christopher Coley, "Optical Interference Mitigation", 14 pages.
Office Action for U.S. Appl. No. 12/975,175, mailed on Apr. 10, 2014, William Spencer Worley III, "Designation of Zones of Interest Within an Augmented Reality Environment", 33 pages.
Office Action for U.S. Appl. No. 12/977,992, mailed on Apr. 4, 2014, William Spencer Worley III, "Unpowered Augmented Reality Projection Accessory Display Device", 6 pages.
Final Office Action for U.S. Appl. No. 12/982,457, mailed on May 8, 2014, William Spencer Worley III, "Utilizing Content Output Devices in an Augmented Reality Environment", 58 pages.
Office action for U.S. Appl. No. 12/978,800, mailed on Jun. 17, 2014, Worley III, "Integrated Augmented Reality Environment", 40 pages.
Office action for U.S. Appl. No. 12/977,760, mailed on Jun. 4, 2013, Worley III et al., "Generation and Modulation of Non-Visible Structured Light", 12 pages.
Office action for U.S. Appl. No. 12/982,519, mailed on Aug. 14, 2014, Worley III, "Complementing Operation of Display Devices in an Augmented Reality Environment", 12 pages.
Office action for U.S. Appl. No. 12/982,519, mailed on Aug. 29, 2013, Worley III, "Complementing Operation of Display Devices in an Augmented Reality Environment", 12 pages.
Pinhanez, "The Everywhere Displays Projector: A Device to Create Ubiquitous Graphical Interfaces", IBM Thomas Watson Research Center, Ubicomp 2001, 18 pages.
Sneath, "The Bumper List of Windows 7 Secrets", retrieved on Aug. 21, 2013, at http://blogs.msdn.com/b/tims/archive/2009/01/12 the bumper-list-of-windows-7-secrets.aspx., 2009, 13 pages.

* cited by examiner

| Time 502 | Image Frame 504 | Sub-Frame 506 | Image Property Excursion (e.g. chrominance) 508 | Structured Light Pattern 510 | Block Size 512 |
|---|---|---|---|---|---|
| 0 | 1 | 1 | +2 RED | 1 | 4x4 |
| 1 | 1 | 2 | -2 RED | 1 | 4x4 |
| 2 | 1 | 3 | +1 GREEN | 2 | 8x8 |
| 3 | 1 | 4 | -1 GREEN | 2 | 8x8 |
| 4 | 2 | 1 | +3 BLUE | 3 | 6x6 |
| 5 | 2 | 2 | -3 BLUE | 3 | 6x6 |
| 6 | 2 | 3 | +1 RED | 4 | 9x9 |
| 7 | 2 | 4 | -1 RED | 4 | 9x9 |
| 8 | 3 | 1 | +2 LUMINANCE | 5 | 7x7 |
| 9 | 3 | 2 | -2 LUMINANCE | 5 | 7x7 |
| 10 | 3 | 3 | +2 GREEN & +1 LUMINANCE | 4 | 8x8 |
| 11 | 3 | 4 | -2 GREEN & -1 LUMINANCE | 4 | 8x8 |
| 12 | 4 | 1 | NONE | NONE | NONE |
| 13 | 4 | 2 | NONE | NON | NONE |

500

Integration time of user's eye — 514

| Object 1402 | Width (mm) 1404 | Height (mm) 1406 | Length (mm) 1408 | Shape (General) 1410 | Environmental Assumptions 1412 |
|---|---|---|---|---|---|
| Television / Display | 1600 | 900 | 900 | Rectangular | Not floors, typ. vertical |
| Beverage can (USA) | 65 | 60-170 (typ. 123) | 60-170 (typ. 123) | Cylinder | Not on wall or ceiling |
| Electrical outlet faceplate (USA) | 68 | 111 | 0-5 | Rectangular, with two holes | Not doors or windows |
| Adult chair | 340-1100 | 420-1000 | 340-1100 | Complex, w/ defined seating area | Floor |
| Table | 30-2100 | 30-1000 | 30-3000 | Flat, rectangular | Floor |
| Adult person | 30-1000 | 1200-2100 | 160-1000 | Complex | Not on ceiling |
| Light switch | 68 | 111 | 0-25 | Rectangular, may have protrusion | Walls |

FIG. 14

CHARACTERIZATION OF A SCENE WITH STRUCTURED LIGHT

RELATED APPLICATIONS

This application is a divisional of and claims the benefit of U.S. patent application Ser. No. 12/977,924 filed on Dec. 23, 2010 which is incorporated by reference herein in its entirety.

BACKGROUND

Characterization of a scene and objects within the scene has traditionally involved user interaction during calibration. For example, the user may be required to place calibration targets or make and input manual measurements of the physical environment. Using the calibration targets, manual measurements, or both, a physical arrangement of the scene may be reconstructed. However, this calibration is time consuming, difficult, and constrained to the position at which the scanning equipment resided during the calibration.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 is an illustrative table showing a sequence of sub-frames in an imperceptible structured light pattern.

FIG. 14 is a diagram of an illustrative object datastore containing information about known objects, such as environmental assumptions about those objects, dimensions, and so forth.

DETAILED DESCRIPTION

Figure 1:
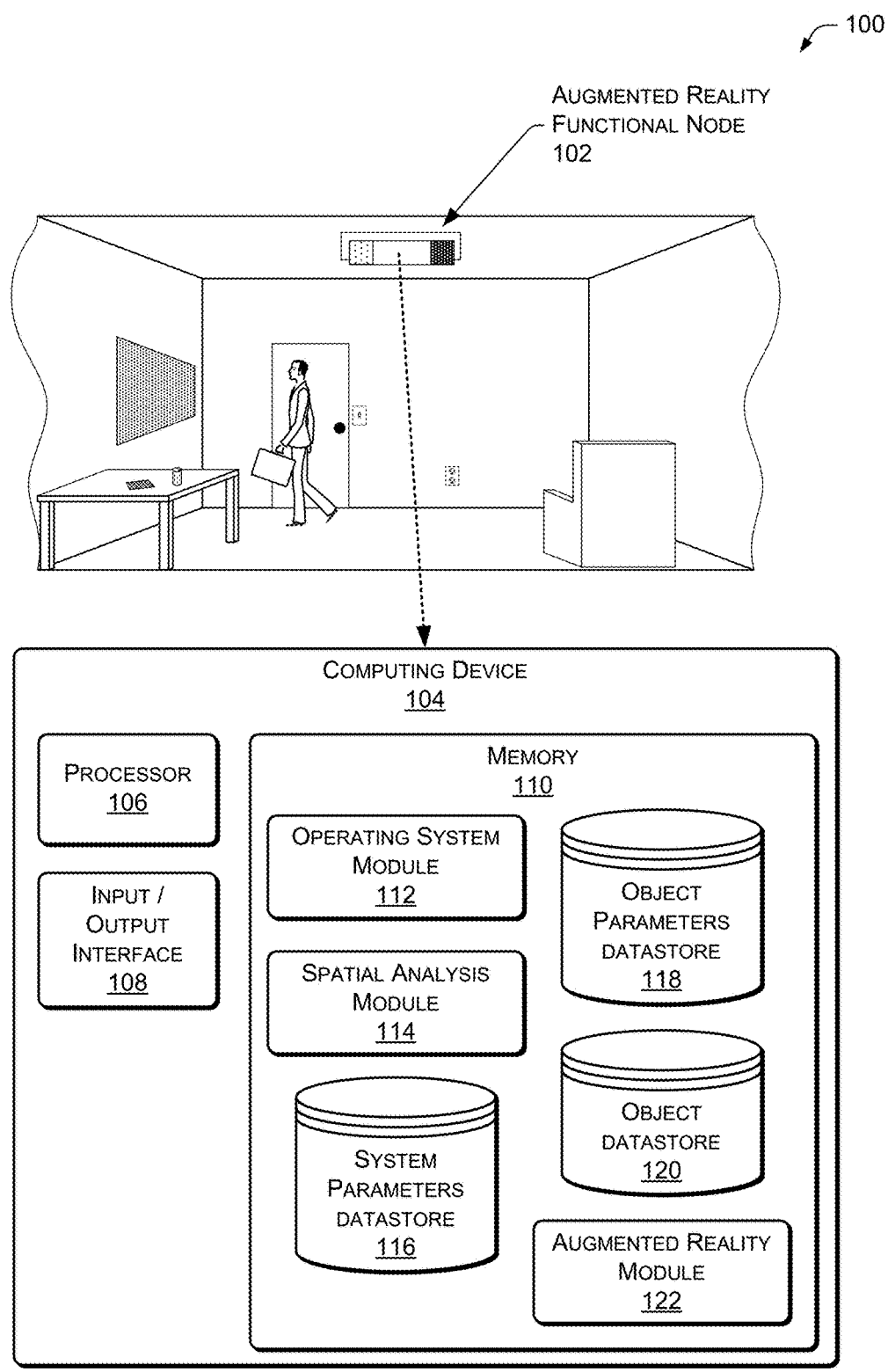
FIG. 1 shows an illustrative augmented reality environment which includes a scene with an augmented reality functional node associated computing device and spatial analysis module configured to characterize the scene.

Characterization of a scene, or volume, and building a model of the scene and objects within the scene is useful in a variety of situations including architectural analysis, interior design, engineering planning, construction, providing augmented reality environments, and so forth. Augmented reality environments provide a mechanism for virtual objects and physical objects to interact within a physical space.

Until now, modeling the scene to determine the topology, positioning, and dimensions of objects within the scene has involved complicated and arduous calibration routines or expensive hardware. Disclosed herein are devices and techniques for characterization of a scene and the objects therein with no or minimal human intervention. Characterization may be accomplished using several technologies including structured light, light detection and ranging (LIDAR), optical time-of-flight, ultrasonic ranging, stereoscopic imaging, radar, and so forth either alone or in combination with one another. For convenience, and not by way of limitation, the example in this disclosure refer to structured light. Once the scene and the objects are characterized, a model of the scene and the objects may be constructed.

Characterization of the scene involves determining placement of objects within the scene. Relative placement indicates that one object is closer or farther to a reference point than another object. In comparison, actual placement indicates that the object is in a particular location in the scene, such as five meters away from the reference point, two meters from the wall, and so forth.

Another aspect of characterization of the scene is dimensioning objects therein. Dimensioning may also be relative or actual. Relative dimensions indicate that one object is physically larger than another. For example, the door is taller than the user. Actual dimensions assign standardized units to the object. For example, the user is two meters tall.

Structured light may be used to characterize the scene. Structured light involves the projection of a known image or structured light pattern onto an otherwise unknown scene. An imaging sensor acquires an image of the known pattern as distorted by objects in the scene. From this acquired image, structured light data is recovered. The topology of the scene including the objects therein may then be determined from the structured light data.

The structured light may comprise wavelengths non-visible to the user, wavelengths visible to the user, or both. The structured light pattern that uses visible light wavelengths may be configured such that the structured light pattern is imperceptible. This imperceptible structured light pattern may comprise a base image modulated with the structured light pattern to generate a plurality of sub-frames containing a set of opposing excursions in one or more image properties. These excursions may be pre-determined or vary dynamically between the pluralities of sub-frames. By balancing the excursions within the plurality of sub-frames over the integration time of the user's eye, the net effect on the image is imperceptible.

As described herein for illustration and not by way of limitation, the combination of the projector configured to generate structured light patterns and the camera to acquire images of the distorted patterns may be incorporated into a single unit. In this disclosure, this unit is designated an augmented reality functional node (ARFN). In other implementations, other configurations of one or more projectors and one or more cameras may be used.

Actual placement and actual dimensioning of objects within the scene may be directly determined in some situations by using the structured light data and considering system parameters and object parameters. For example, the ARFN may be configured to pan, thus providing different views of the scene. By considering system parameters such as the pan angle and the structured light data recovered from several views of the scene at different pan angles, actual dimensioning, actual placement, and so forth may be determined. In some implementations, the dimensions may be designated as preliminary dimensions until confirmed through testing with other dimensional data.

Dimensions may also be determined indirectly by testing assumptions about objects within the scene. In one implementation, preliminary dimensions may be assigned to the object based upon identification of an object and by retrieving data from an object datastore which contains data about known objects. The preliminary dimensions for identified objects may be used as a basis for applying tentative dimensions to other objects within the scene, such as those which are unidentifiable.

The preliminary dimensions, tentative dimensions, or both may be tested using data and assumptions about the objects, the environment, or both. Dimensions which fail testing are discarded, and other assumptions are tested. The testing process may be iterated until the preliminary and tentative dimensions meet a pre-determined error threshold of accuracy. The preliminary and tentative dimensions may then be designated as actual dimensions when that threshold is reached.

Dimensional information determined directly and dimensional information determined by testing may be combined. For example, the dimensions and placement of a directly dimensioned object may be combined with testing of dimensions for other objects to determine the dimensions of the other objects, or to constrain the dimensions of those other objects.

A model of the scene is built with the determined placement and dimensional information. This model may include the various objects within that scene, their dimensions, and their placement in three-dimensional space. Once built, this model may be used to support an augmented reality environment, for example.

Illustrative Environment and Architecture

FIG. 1 shows an illustrative augmented reality environment 100 which includes a scene and an augmented reality functional node (ARFN) 102 with associated computing device 104. In this illustration, the ARFN 102 is positioned approximately at the mid-ceiling of the environment, in this case a room with a user. In other implementations the ARFN 102 may be positioned in other locations within the environment. The ARFN 102 may access additional resources, such as those on the local area network, or cloud resources accessible via a wide area network. In some implementations, multiple ARFNs 102 may be positioned in the environment.

The ARFN 102 is coupled to the computing device 104. This computing device may be within the ARFN 102, or disposed at another location and coupled to the ARFN 102 via a wired or wireless network. The computing device 104 comprises a processor 106, an input/output interface 108, and a memory 110. The processor 106 may comprise one or more processors configured to execute instructions. The instructions may be stored in the memory 110, or in other memory accessible to the processor 106.

The input/output interface 108 may be configured to couple the computing device 104 to other components such as a projector and a camera, to other ARFNs 102, networks, other computing devices, and so forth. The coupling between the computing device 104 and the components may be via wire, fiber optic cable, or wireless or other connections. Wireless connections as used herein include radio frequency, optical, ultrasonic, and magnetic signaling.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instruction, datastores, and so forth may be stored within the memory 110 and configured to execute on a processor, such as the processor 106. An operating system module 112 is configured to manage hardware and services within, and coupled to, the computing device 104 for the benefit of modules. Modules may be stored in the memory of the ARFN 102, storage devices accessible on the local network, or cloud storage accessible via a wide area network.

A spatial analysis module 114 is configured to perform several functions which may include analyzing a scene to generate a topology, recognizing objects in the scene, dimensioning the objects, and modeling the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 is described in more detail below with regards to FIG. 11.

A system parameters datastore 116 is configured to maintain information about the state of the computing device 104, the input/output devices of the ARFN 102, and so forth. For example, system parameters in the datastore 116 may include current pan and tilt settings of the camera(s) and projector(s). The system parameters 116 in the datastore are described in more depth below with regards to FIG. 12. As used throughout this disclosure, datastore includes lists, arrays, databases, and other data structures used to provide storage and retrieval of data.

An object parameters datastore 118 in the memory 110 is configured to maintain information about the state of objects within the scene. This information may be acquired via sensors in the ARFN 102, from other input devices, or via manual input. For example, the object parameters 118 may include the surface contour of the object and the overall reflectivity determined from the object's interaction with the structured light pattern. The object parameters 118 are discussed in more depth below with regards to FIG. 13.

An object datastore 120 is configured to maintain information about objects for use by the spatial analysis module 114. This information may include assumptions about the object, dimensions, and so forth. For example, the object datastore 120 may include a reference object of a beverage can and include the assumptions that beverage cans are either held by a user or sit on a surface, and are not present on walls or ceilings. The spatial analysis module 114 may use this data maintained in the datastore 120 to test dimensional assumptions when determining the dimensions of objects within the scene. The object datastore 120 may include a library of pre-loaded reference objects, as well as objects which are temporally persistent within a particular environment, such as a wall, particular table, user and so forth. The object datastore 120 may be stored on one or more of the memory of the ARFN 102, storage devices accessible on the local network, or cloud storage accessible via a wide area network. The object datastore 120 is described in more depth below with regards to FIG. 14.

An augmented reality module 122 is configured to generate augmented reality output in concert with the physical environment. For example, the augmented reality module 122 may be configured to project a virtual image onto a wall which tracks and follows the user who initiated the presentation of the image. The augmented reality module 122 may access input/output devices within one or more ARFN nodes 102 to generate output and receive input.

Figure 2:
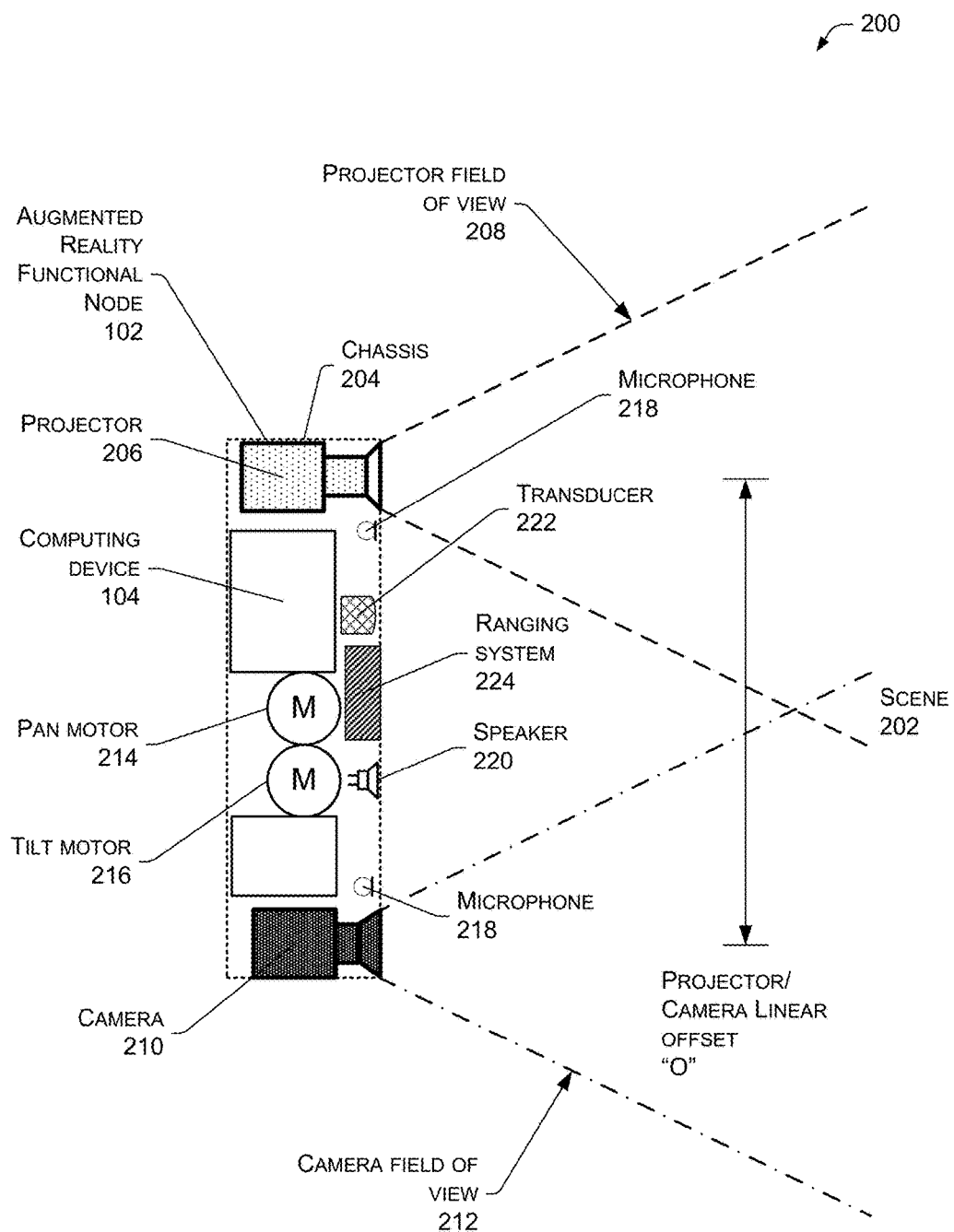
FIG. 2 shows an illustrative augmented reality functional node and selected computing device, along with other selected components.

FIG. 2 shows an illustrative schematic 200 of the augmented reality functional node 102 and selected components. The ARFN 102 is configured to scan at least a portion of a scene 202 and the objects therein. The ARFN 102 may also be configured to provide output. The sensors and modules within the ARFN 102 characterize the scene as described herein.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3 LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations a plurality of cameras 210 may be used.

The chassis 204 may be mounted with a fixed orientation or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. The actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. These different views may be used to characterize the scene, as described below with regards to FIGS. 7-10.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise such as a tap on a wall or snap of the fingers to initiate an augmented reality function. The user may alternatively use voice commands. Such audio inputs may be located within the scene using time-of-arrival differences among the microphones and used to summon an active zone within the augmented reality environment.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 on the local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations the components of the ARFN 102 may be distributed in one or more locations within the scene. As mentioned above, microphones 218 and speakers 220 may be distributed throughout the scene. The projector 206 and the camera 210 may also be located in separate chassis 204.

Structured Light

Figure 3:
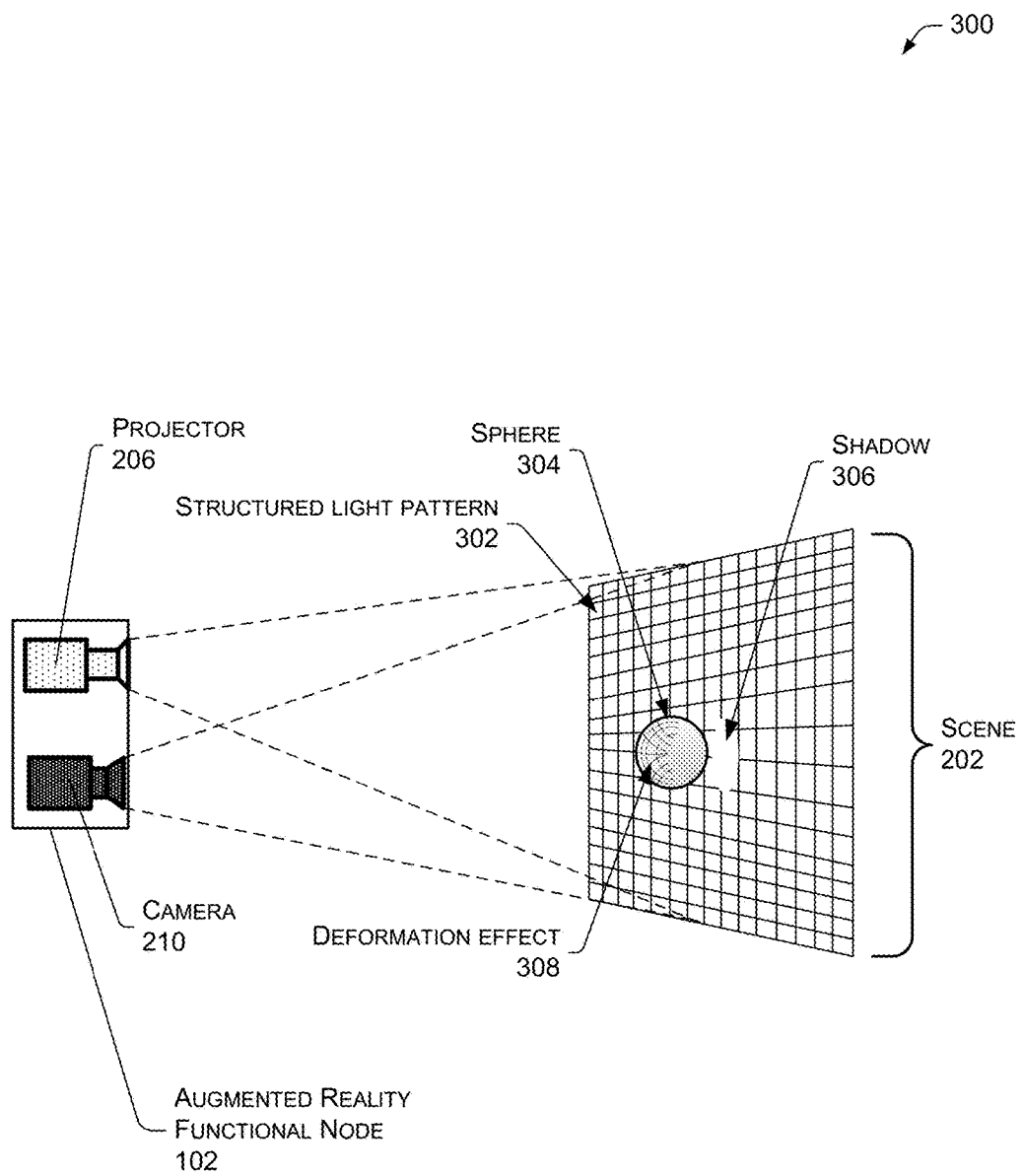
FIG. 3 illustrates the augmented reality functional node projecting a structured light pattern on a scene and receiving a corresponding image of the scene.

FIG. 3 illustrates a structured light pattern 300 impinging on the scene. In this illustration, the projector 206 within the ARFN 102 projects a structured light pattern 302 onto the scene 202. In some implementations a sequence of different structure light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

In some implementations data to be received by objects within the scene may be embedded in the structured light pattern 302. For example, portable devices within the scene may commands to generate haptic output in response to data modulated within the light emitted by the projector 206.

The cameras 210 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths which are visible to the user, non-visible to the user, or a combination thereof. The structured light pattern 504 is shown in this example as a grid for ease of illustration and not as a limitation. In other implementations other patterns, such as bars, dots, pseudorandom noise, and so forth may be used. Pseudorandom noise (PN) patterns are useful as structured light patterns because a particular point within the PN pattern may be specifically identified. A PN function is deterministic in that given a specific set of variables, a particular output is defined. This deterministic behavior allows the specific identification and placement of a point or block of pixels within the PN pattern. In some implementations, a plurality of structured light patterns 302 may be used to image the scene. These may include different PN patterns, geometric shapes, and so forth.

A sphere 304 is shown positioned between the projector 206 and a wall in the scene 202. A shadow 306 from the sphere 304 appears on the wall. Inspection of the sphere 304 shows a deformation effect 308 of the structured light pattern 302 as it interacts with the curved surface of the sphere 304.

In some implementations other effects, such as dispersion of the structured light pattern 302 may be used to provide information on the topology of the scene. Where the projector 206 and camera 210 have differing fields of view, such as shown in FIG. 2, the dispersion or change in the "density" of the structured light pattern 302 may be used to determine depth of field.

The camera 210 detects the interaction of the structured light pattern 302 with objects within the scene. For example, the deformation effect 308 on the sphere 304 is detected by the camera 210. The camera 210 is configured to sense or detect the structured light. In some implementations the camera 210 may also sense or detect wavelengths other than those used for structured light pattern 302. The image captured by the camera 210 is processed by the spatial analysis module 114 to characterize the scene 202. In some implementations, multiple cameras may be used to acquire the image.

Figure 19:
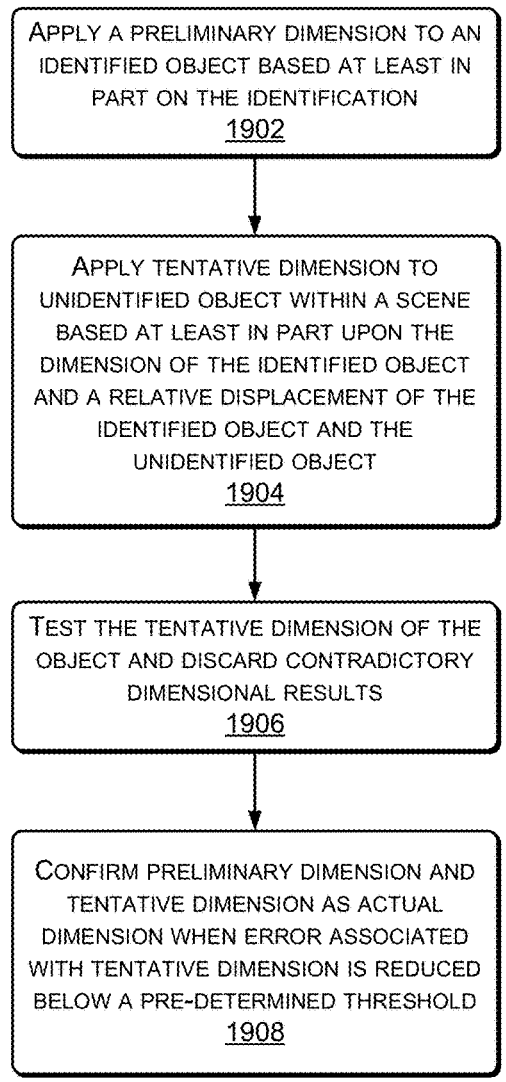
FIG. 19 is an illustrative process of determining dimensions of objects within the scene.
Figure 20:
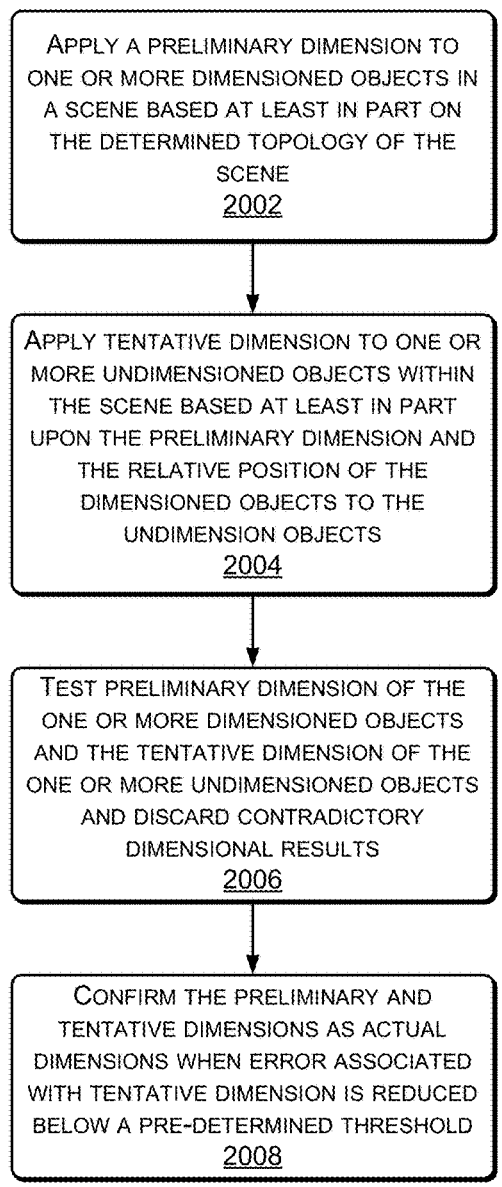
FIG. 20 is an illustrative process of determining dimensions of objects within the scene by testing tentative dimensioning based at least in part upon the topologies of a plurality of objects within the scene.

The actual size of the sphere 304 in this example may not be readily determined based upon the geometry of the ARFN 102, diameter of the sphere 304, distance between the ARFN 102 and the sphere 304, and so forth. As a result, the spatial analysis module 114 may be configured to make one or more assumptions about the scene, and test those assumptions to constrain the dimensions of the scene 202. FIGS. 19-20 below discuss this testing in more detail.

As mentioned above, the structured light pattern 302 may be projected using light which is visible to the user, non-visible to the user, or a combination of the two. Non-visible light offers the advantage of allowing the structured light pattern 302 to be projected onto the scene and remaining undetectable to the user. Non-visible light, however, may require special equipment or adaptations to the equipment to generate and modulate the non-visible light. For example, an image projector may incorporate a color wheel with segments configured to pass infrared light as well as visible light wavelengths.

Structured light patterns 302 may also be generated using wavelengths visible to the user. Visible wavelength structured light allows the use of existing image projection and image acquisition hardware. Visible wavelength structured light also allows for color characterization of objects. For example, primary color structured light patterns may be used to determine absorption and reflection of the primary color on objects within the scene. This color characterization may be utilized in some implementations to color correct for projection of an image onto a surface. For example, an image projected by the ARFN 102 onto a yellow writing pad may be color corrected to account for the yellow color of the pad.

While structured light patterns using visible light wavelengths are useful in characterizing the scene, they may be distracting or otherwise undesirable to users. Thus, generation and use of structured light patterns 302 which use visible light wavelengths yet are imperceptible is beneficial. Described next is one illustrative process of generating imperceptible visible light imperceptible visible light structured light pattern.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other systems as well.

Figure 4:
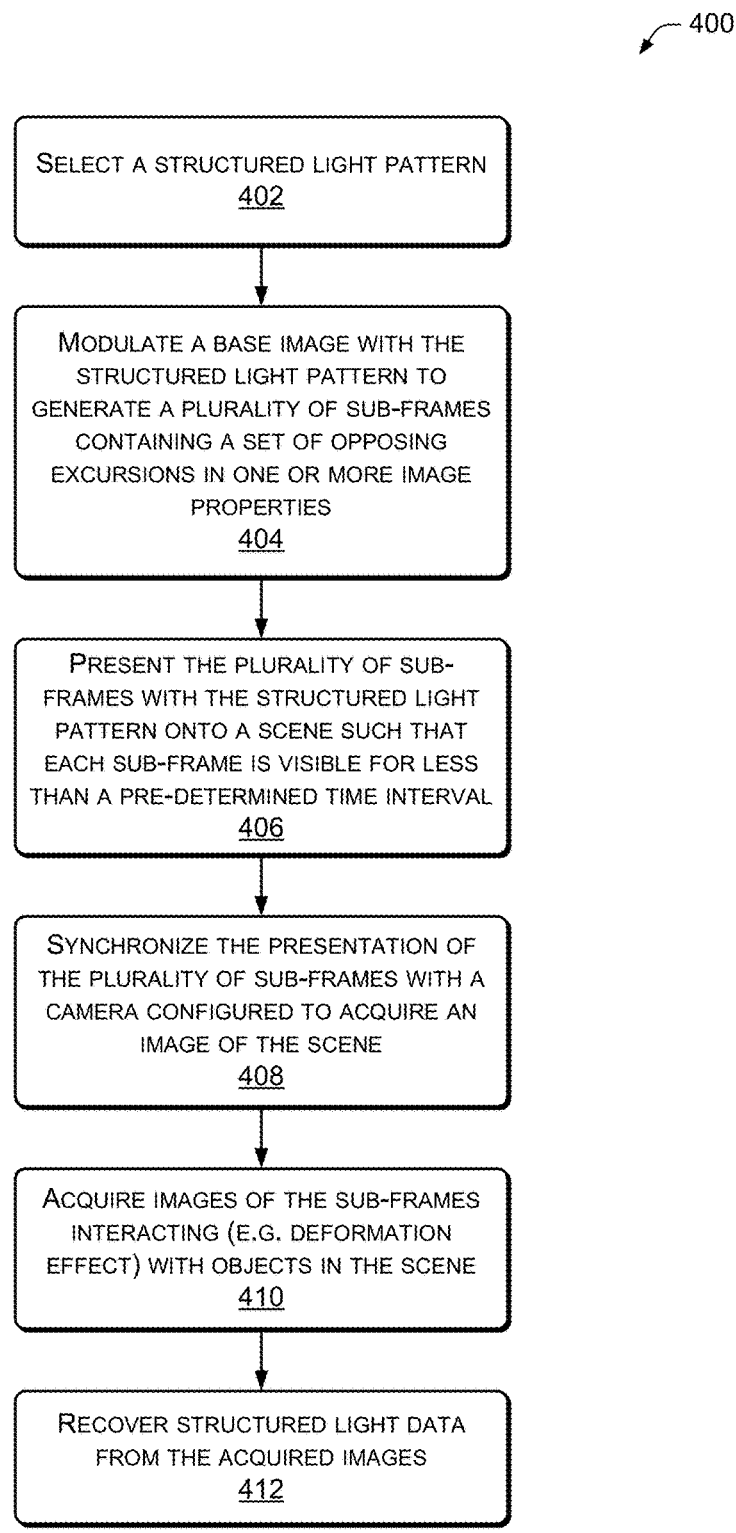
FIG. 4 illustrates a process for generating a visible light structured light pattern which is imperceptible to a user.

FIG. 4 illustrates a process 400 for generating an imperceptible visible light structured light pattern. A detector requires a minimum integration time to capture enough photons to generate a signal. This minimum integration time varies with the type of detector. For example, the human eye has a longer integration time than a silicon-based imaging sensor.

The presentation of apparently color images from a DMD projector exploits the relatively long integration time of the human eye by breaking an individual image or frame into sub-frames. Each sub-frame represents a particular color channel such as red, green, and blue. Each sub-frame is shown in rapid succession, and over the integration time of the user's eye, the different colors of light from each sub-frame are received and integrated into what is perceived as a single color image.

One or more image properties of one or more sub-frames may be adjusted to embed structured light patterns which use visible light yet are imperceptible to the user. This adjustment of the image properties may be pre-determined or dynamic. Imperceptible structured light takes advantage of the difference in integration times between detectors, and modulates sub-frames of the projected image such that the net effect of embedding the structured light signal into the projected image is zero to detectors with longer integration times (and lower scan rates), such as the human eye, yet recoverable by detectors with shorter integration times (and higher scan rates).

At 402, the structured light pattern 302 is selected. This structured light pattern may be pre-generated, previously generated and stored, or a combination thereof. This pattern may comprise pixel blocks or other features placed using a pseudo-random noise generator. Individual pixel blocks may be configured such that they are at least large enough to be perceptible to the camera 210. The pixel blocks may be dynamic in size and may differ within a given structured light pattern, between different structured light patterns, or both. For example, when the structured light is scanning an object which is close to the ARFN 102, the pixel block may be small, such as 2×2 pixels. In comparison, when scanning an object which is distant, the pixel block may be increased to a 24×24 block so that the block is visible to the camera 210.

At 404, a base image, or the sub-frames thereof, is modulated with the selected structured light pattern containing a set of opposing excursions in one or more image properties such that over a pre-determined length of time the excursions average out to zero. When the image does not comprise sub-frames, sub-frames may be generated from the base image. Image properties include chrominance, luminance, and so forth. Changes to some image properties may be more perceptible than others. For example, the human eye is generally more sensitive to luminance changes than chrominance changes. As a result, in some implementations chrominance changes may be used to encode the structured light pattern to further minimize perceptibility. Also, because the human eye is sensitive to lines and arcs, use of a PN pattern further reduces perceptibility due to its apparently random nature.

By generating a set of opposing excursions in one or more image properties of several sub-frames, no net effect is visible over the integration time of the user's eye. For example, changes to the chrominance or color of the image may be used to embed the structured light pattern in the base image. Pixels in a first sub-frame are modified to increase the chrominance values by a pre-determined amount, while pixels in a subsequent second sub-frame are modified to decrease the chrominance values by the pre-determined amount. In some implementations, the encoding of the base image may be compressed to provide for the additional excursion in image properties incurred by the modulation.

At 406, the plurality of sub-frames is presented onto the scene, such that each sub-frame is visible for less than a pre-determined time interval. This pre-determined time interval may be configured to minimize perception, reduce flicker, and so forth.

At 408, the presentation of the plurality of sub-frames is synchronized with the camera 210 which is configured to acquire an image of the scene. Such synchronization aids in the recovery of structured light data by allowing acquisition of images of the scene with a known state.

At 410, images of the modulated sub-frame images containing the structured light pattern interacting with the scene are acquired. The camera 210 with its faster integration time is able to see the individual sub-frames, but the user's eye with a longer integration time only sees the net effect, which is nothing due to the opposing excursions. As a result, the user perceives the base image, and not the structured light pattern. Thus, while the structured light pattern is rendered in visible light, it is imperceptible to the use.

At 412, structured light data is recovered from the acquired images. For example, where the opposing excursions are distributed across two sub-images A and B, the structured light data may be recovered by subtracting image B from image A. In some implementations, motion compensation or other filtering techniques may be applied. FIG. 5 is an illustrative table 500 showing a sequence of frames and sub-frames used to generate an imperceptible structured light pattern. This table contains several fields: a first field 502 indicating elapsed time, a second field 504 indicating an image frame number, a third field 506 indicating a sub-frame number, a fourth field 508 indicating an image property which is modulated, a fifth field 510 showing a structured light pattern in use, and a sixth field 512 indicating a block size. Also shown is the typical integration time of the user's eye 514 to perceive the image.

As shown in this example, the image properties 508, structured light patterns 510, and block size 512 may vary. For example, when time 502 is zero, the first sub-frame 506 of the first frame 504 is shown. This sub-frame 506 is configured to encode the first structured light pattern 510 such as a PN pattern having block sizes 512 of 4×4 pixels into the base image using a chrominance excursion of +2 in the red channel. The next sub-frame 506, at time 1 in the time field 502, shows an opposing excursion of −2 in the red channel. Because the sub-frames 506 are presented for less than the integration time of the user's eye 514, their net effect is zero, and thus imperceptible.

As the remainder of the table shows, the opposing excursions may use different excursion ranges, different image properties, different structured light patterns, and different block sizes. By varying the image properties across different colors, visible light absorption and reflection of objects within the scene may be characterized. Once characterized, this information may be stored within the object parameters datastore 118. This characterization may then be used for various purposes, such as color correction when projecting an image onto the object.

While this table 500 illustrates opposing excursions distributed across two sub-frames 506, in some implementations the opposing excursions may be distributed across three or more sub-frames. For example, the opposing excursion may be distributed across three sub-frames such that the excursion pattern is −1, +2, −1.

In other implementations, other image properties may be shifted. For example, at times 8 and 9 the excursion 508 may be +2 and −2 luminance rather than a chrominance excursion. Similarly, multiple image properties may be shifted simultaneously. For example, as shown at times 10 and 11, the excursion 508 is +2 green chrominance with +1 luminance and −1 green chrominance with −1 luinance. By imposing this opposing excursion pattern on the sub-frames, the ARFN 102 can embed the structured light pattern within the visible light images.

The excursions in one or more image properties may vary dynamically from one plurality of sub-frames to another. This dynamic variation may occur at least partly in response to conditions within the environment. These conditions may include system parameters, object parameters, characteristics of the base image, ambient lighting levels, color of objects in the scene, and so forth. For example, as shown in this table, suppose a curtain is drawn on a window in the scene and the overall ambient light level is decreased while the base image switches from a yellow desert to a predominately green forest. At least partly in response to these changing conditions, the image property excursion 508 for times 8-11 has been dynamically altered to use luminance which may be more reliable in the darker conditions and green chrominance because the base image comprises more green elements.

Structured light patterns may not be embedded in every sub-frame. For example, as shown at times 12 and 13, no structured light pattern is present. In some implementations, data for transmission to devices within the scene may be embedded into the images. For example, a pair of sub-frames may be configured to transmit data rather than generate structured light patterns. By monitoring the two or more subframes which embed the data in with imperceptible excursions, the receiving device may realize additional redundancy and error correction in the transmission. In some implementations this data may include timing or synchronization signals suitable for coordinating devices within the environment.

The structured light patterns may be synchronized among multiple devices such as cameras and projectors. Such synchronization allows for contemporaneous use of multiple structured light patterns within the scene. For example, ARFN 102(1) may be configured to use structured light pattern 1 with green excursions at times 2-3 while ARFN 102(2) is configured to use structured light pattern 2 with blue excursions at the same tie.

Characterization of the Environment

Figure 6:
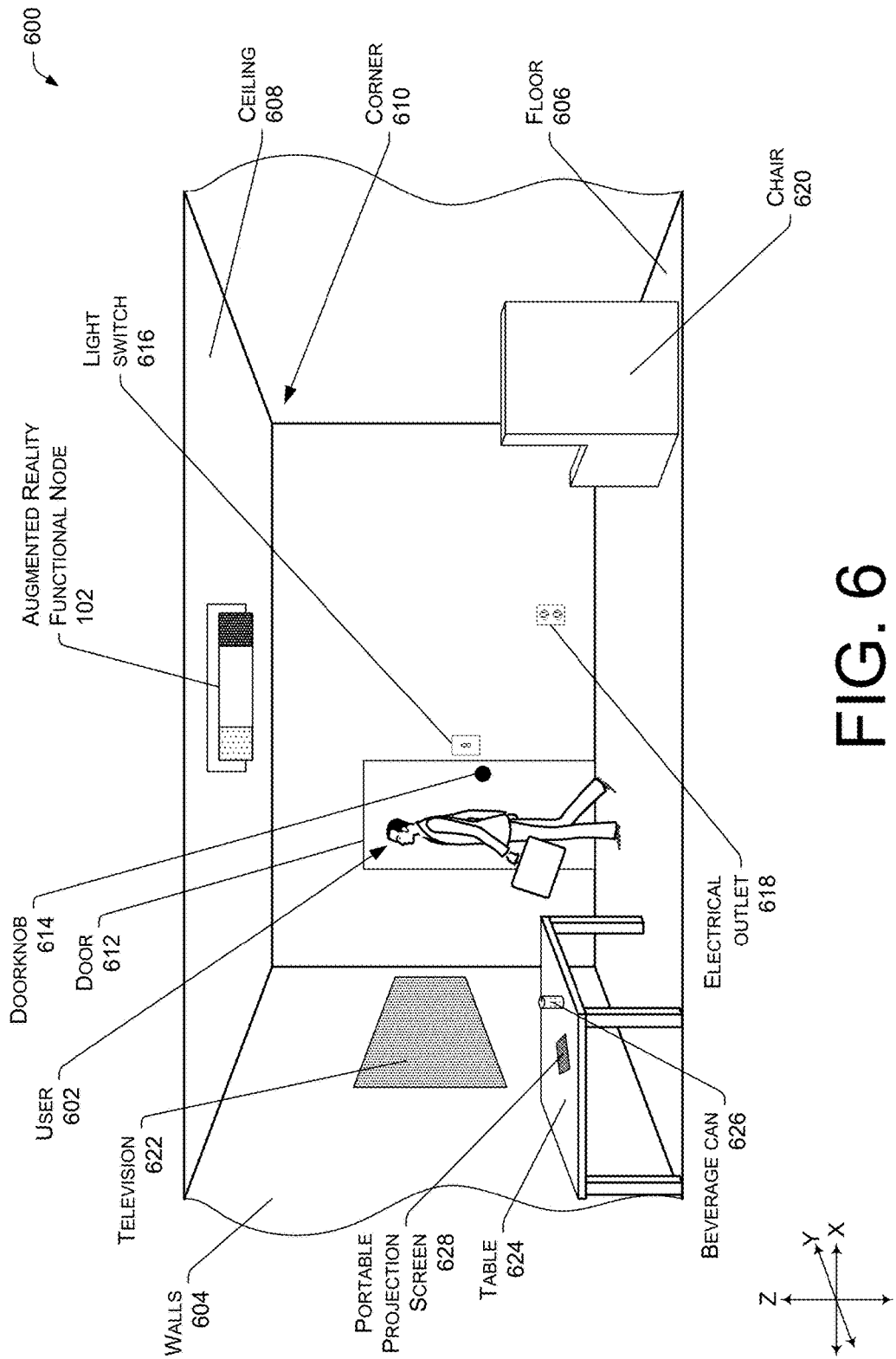
FIG. 6 is a detailed perspective view of an illustrative scene indicating the relative placement of physical objects.

FIG. 6 is a detailed perspective view of an illustrative scene 600. In this illustration scene 600 comprises a room with a user 602. Within this room the ARFN 102 is positioned approximately mid-ceiling. Walls 604, a floor 606, and a ceiling 608 bound the room. Within this room are corners 610 and a door 612 with a doorknob 614.

Positioned adjacent to the doorknob 614 on the wall 602 is a light switch 616. Also on the wall is an electrical outlet 618. Sitting in one corner of the room on the floor is a chair 620 suitable for a single adult person. Disposed on one of the walls 604 is a television 622 or computer display. Sitting in another corner of the room is a table 624. Resting upon the table is a beverage can 626 and a portable projection screen 628.

The ARFN 102 may be configured to provide an augmented reality experience to users within the room. For example, the user 602 may wish to have a set of notes from a recent meeting projected onto part of one of the wall 602 for reference while viewing a high resolution photograph on the television 622. The user's 602 task list may be projected upon the portable projection screen 628. The ARFN 102 may be configured such that motions of the user 602, objects within the scene, or both may be recognized as input allowing interaction with virtual or computer generated items.

Figure 7:
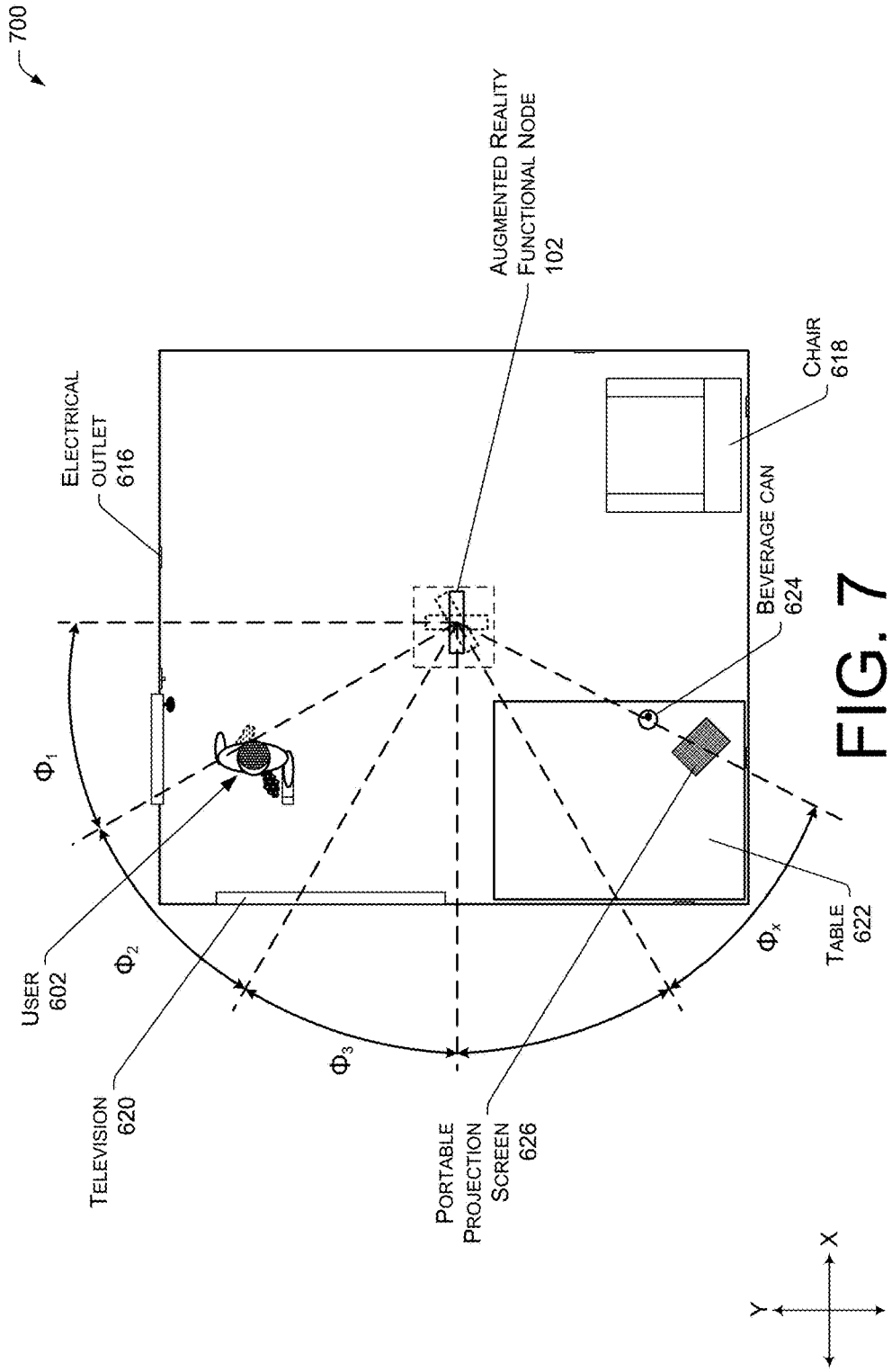
FIG. 7 is a plan view of the scene of FIG. 6, illustrating panning of the augmented reality functional node.

FIG. 7 is a plan view 700 of the environment of FIG. 6. In this illustration, we see the placement of objects within the room. Overlaid in this illustration is a set of angles $\phi_1$ through $\phi_x$. These angles illustrate a panning motion of the ARFN 102 to scan the scene. While the angles $\phi$ are shown about equal to one another, in some implementations the panning angles may vary from scan to scan. For example, $\phi_1$ may describe an arc of 20 degrees, while $\phi_2$ may describe 35 degrees. In some implementations, the scanning may include tilting the ARFN 102. The pan and tilt angular position of the ARFN 102 during a scan may be maintained within the system parameters datastore 116.

Figure 8:
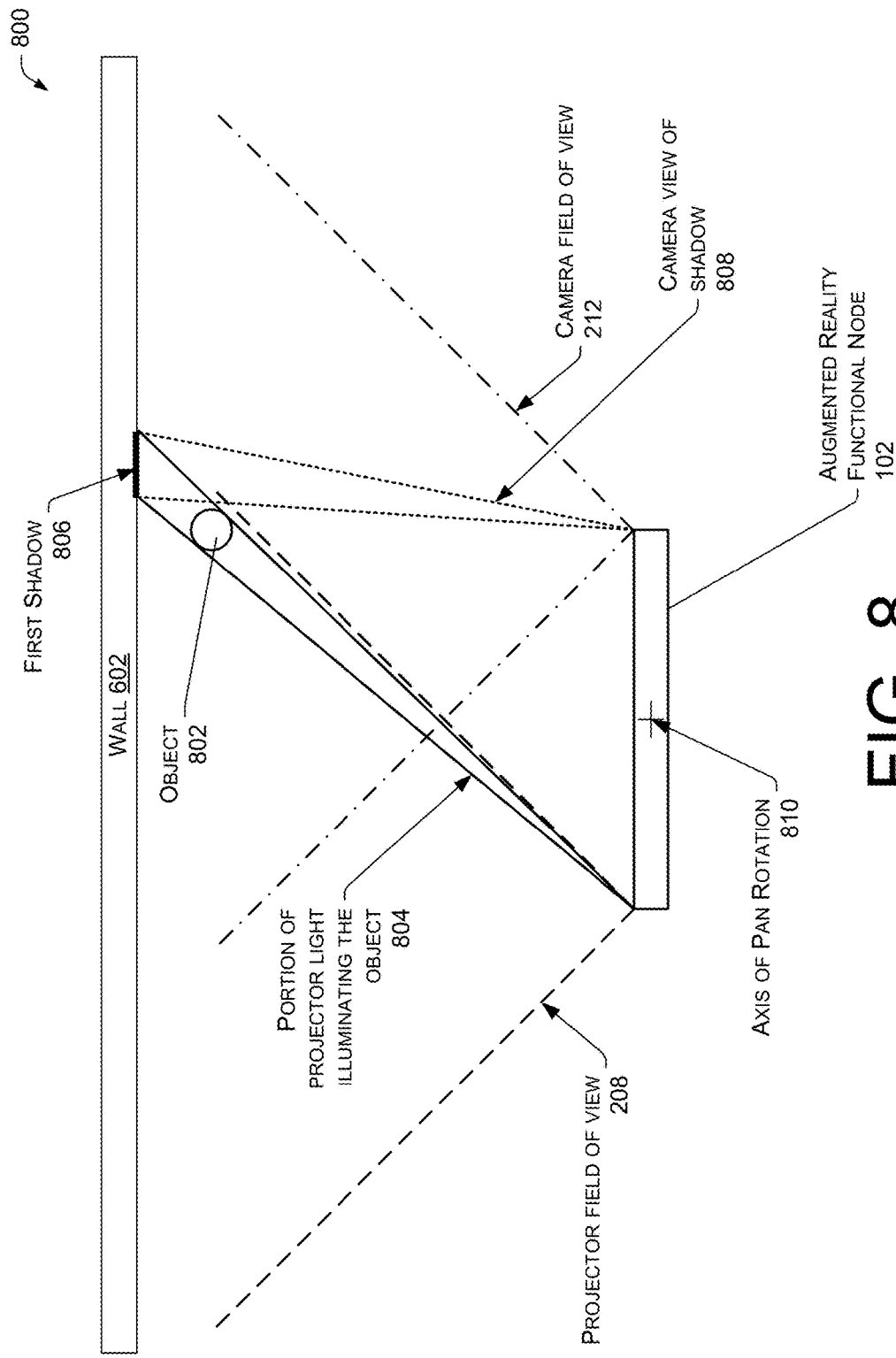
FIG. 8 is a plan view of a simplified scene where the augmented reality functional node is scanning an object within the scene at a first pan angle.

FIG. 8 is a plan view of a simplified scene 800 to illustrate a scan by the ARFN 102 of an object with a first set of system parameters. In this illustration, the first set of system parameters comprises a first pan angle, projector field of view 208, and camera field of view 212. An object 802 is disposed between the ARFN 102 and the wall 602. A portion of the projector light from the projector 206 illuminating the object is shown at 804, which describes the edges of a first shadow 806 on the wall 602. The camera 210 is shown here with a camera view of the shadow 808.

Figure 9:
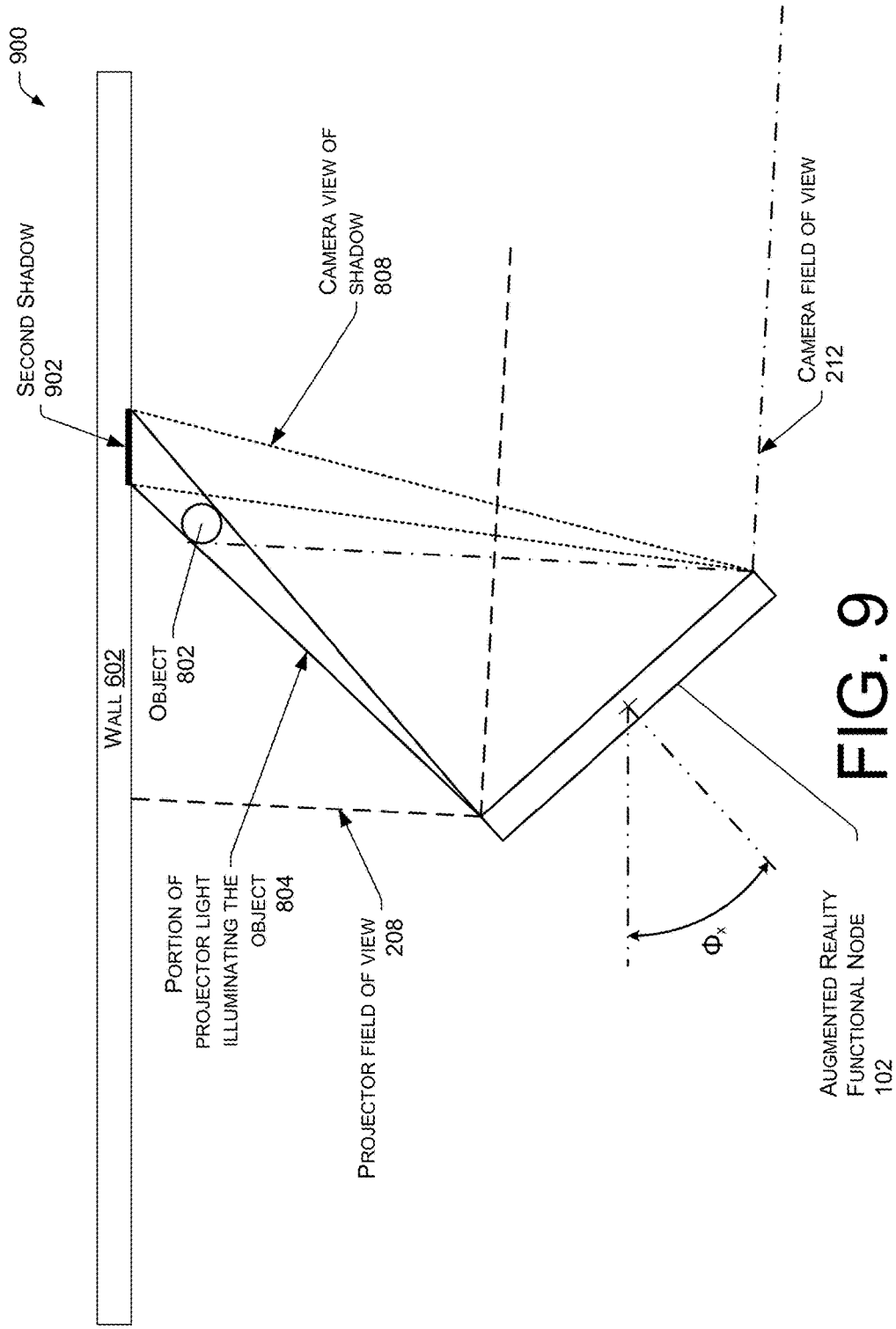
FIG. 9 is a plan view of the simplified scene of FIG. 8 where the augmented reality functional node is scanning an object within the scene at a second pan angle.

FIG. 9 continues the illustration of FIG. 8, but in this view 900 the ARFN 102 is panned to a new angle $\phi_x$ while the object 802 remains stationary. In this illustration, the portion of the projector light illuminating the object 804 now describes a second shadow 902 which is different from the first shadow 806. Although two instances are shown in FIGS. 8 and 9, multiple pan points of reference may be captured. The spatial analysis module 114 may determine position, distance, size, and so forth of objects within the scene by using the differing appearance of the objects and associated shadows given the known angular change.

Figure 10:
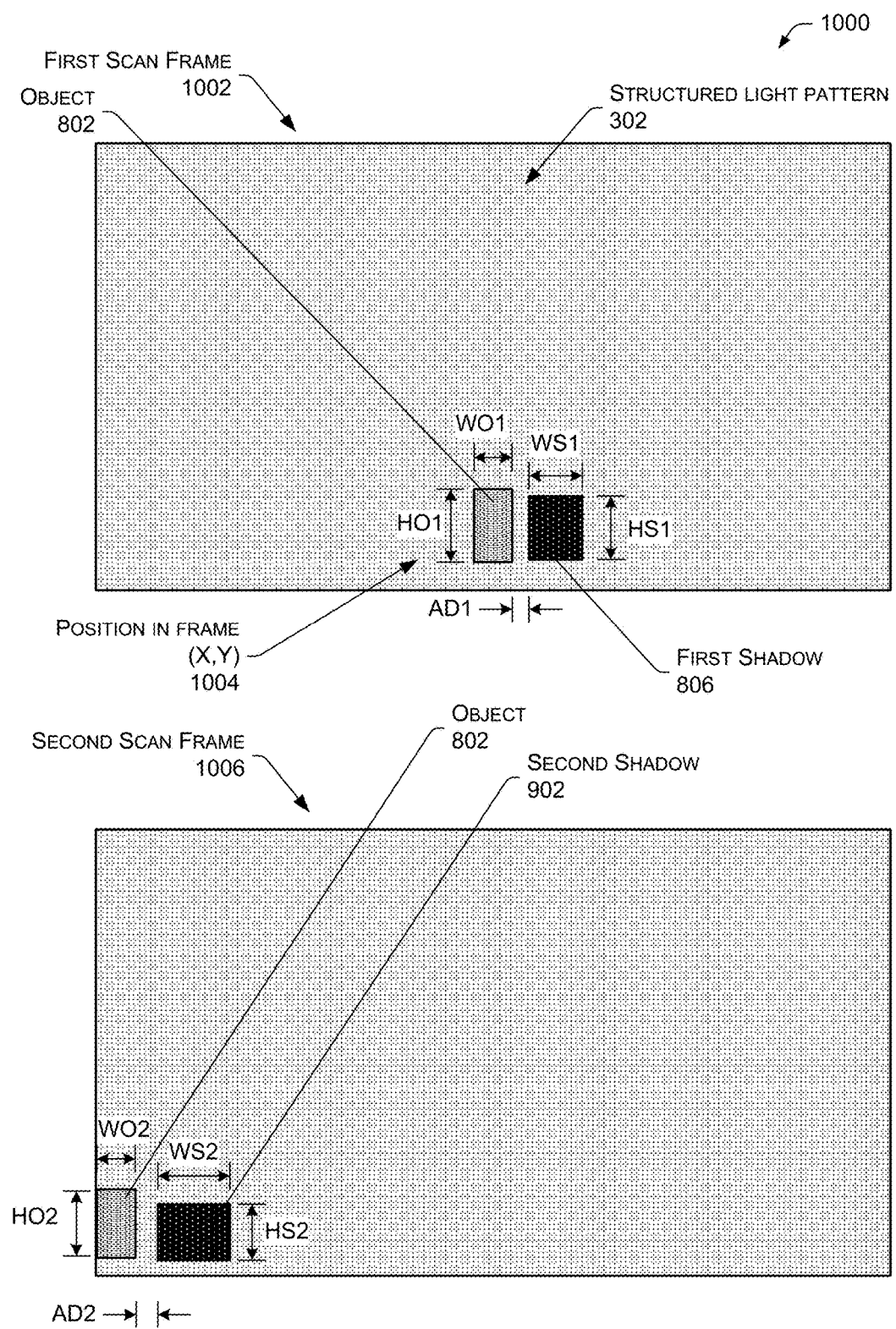
FIG. 10 shows the scan frames from the first pan angle and the second pan angle of FIGS. 8-9 and illustrates the relative changes between the two.

FIG. 10 continues the example of FIGS. 8-9, depicting images 1000 from the two scan positions. A first scan frame 1002 shows the image acquired by the camera 210 when the ARFN 102 is at the first pan angle, as well as the structured light pattern 302 which is projected onto the scene. In this first scan frame 1002, the object 802 and the first shadow 806 are approximately mid-frame, corresponding with the approximate mid-point of the camera field of view 212 of FIG. 8. The object 802 is shown with an apparent height HO1, and an apparent width W01. Also shown is the first shadow 806, which has an apparent height of HS1 and apparent width of WS1. An apparent displacement AD1 is indicated showing the apparent distance between the object 802 and the first shadow 806. The position in the frame 1004 of objects and shadows may also be determined.

A second scan frame 1006 is shown with the ARFN 102 at the second pan angle. Because of the change in position between the projector 206, camera 210, and object 802 resulting from the panning, the image of the object 802 and the second shadow 902 differ between the frames, such that the object 802 and the second shadow 902 are displaced to the relative left edge of the frame. For example, the apparent height HO2 of the object 802 is less than HO1 because the camera 210 is now farther from the object 802. Similarly, the second shadow 902 has a different width WS2 and height HS2, and the apparent displacement between the two has increased from AD1 to AD2.

The spatial analysis module 114 may use this information to determine the placement of the object, the placement of the wall 602, and so forth. Furthermore, once distance to the object 802 is determined, the distance to the wall 602 may also be determined.

Spatial Analysis Module, Parameters and Object Datastore

Figure 11:
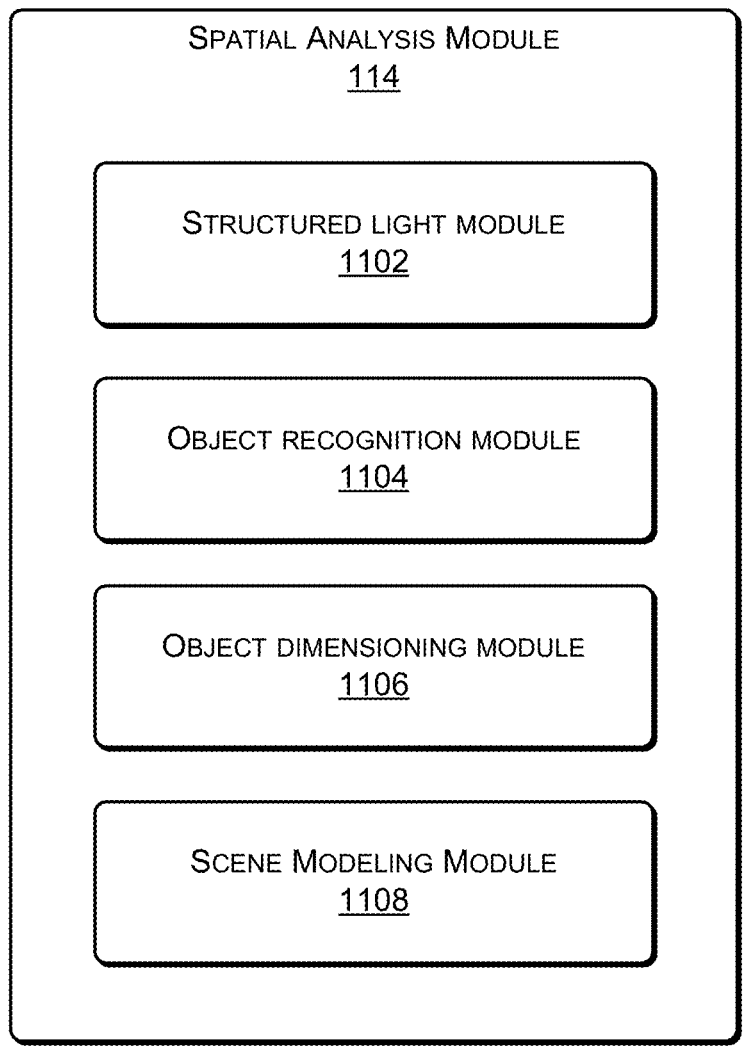
FIG. 11 shows an illustrative implementation of a spatial analysis module, which may be implemented by the augmented reality functional node of FIGS. 1-2.

FIG. 11 shows an illustrative implementation of the spatial analysis module 114 executing in the computer 104 of FIG. 1. The spatial analysis module 114 is configured to perform several functions, and may comprise several modules. Four modules are shown for discussion purposes: a structured light module 1102, an object recognition module 1104, an object dimensioning module 1106, and a scene modeling module 1108.

The structured light module 1102 is configured to generate a structured light pattern that may be projected onto a scene and then analyze the structured light data recovered from the scene. The structured light module 1102 uses the structured light data to determine a topology of the scene.

In other implementations one or more other technologies may be used to determine the topology of the scene. These other technologies include light detection and ranging (LIDAR), optical time-of-flight analysis, ultrasonic ranging, radar, stereoscopic imaging, and so forth.

The structured light module 1102 or other modules may be configured to tag patterns and images projected by the projector 206 as well as the images acquired by the camera 210. In some implementations, these tags may comprise unique monotonically increasing values. Structured light data recovered from the scene may then be correlated with the original source image or pattern by referencing the tags. For example, a tag may be formed as a string <SYSTEM-ID><DEVICE-ID><IMAGE-TAG>, where SYSTEM-ID references a particular ARFN 102, DEVICE-ID indicates a particular device such as a camera 210 coupled to that ARFN 102, and IMAGE-TAG is the unique monotonically increasing value.

The object recognition module 1104 is configured to process the recovered data from the structured light module 1104 to recognize objects. For example, the object recognition module 1104 may be configured to determine that an object is distinct from the table 624, and further recognize the object as being the beverage can 626. The object recognition module 1104 may access the object datastore 120 and compare unknown objects within the scene with reference objects stored therein to identify the object.

An object dimensioning module 1106 attempts to determine the dimensions of objects within the scene directly or indirectly. The object dimensioning module 1106 may directly determine the dimensions, such as via the comparison of different images obtained with different system parameters, as described above with regards to FIGS. 8-10. Once one object is dimensioned, other unknown objects within the scene may be indirectly dimensioned by applying tentative dimensions. These tentative dimensions may be based at least in part upon the direct dimensioning and the relative position of the unknown object compared to the object with directly determined dimensions.

The tentative dimensions may be tested against several pre-determined assumptions to determine likely validity. These assumptions may be stored within the object datastore 120. When the tentative dimensions fail a validity test, it may be discarded or modified and another tentative dimension tested. For example, the object recognition module 1104 may recognize an object as likely being the door 612, and another object as likely being the user 602. Based on assumptions in the object datastore 120, doors are usually larger than individual people. Thus, dimensioning which places the user 602 as being more than 10% larger than the door 612 may be discarded. Dimensioning which places the user 602 as being 10% smaller than the door 612 may be retained for further testing.

In addition to direct dimensioning and indirect dimensioning based on inferences made from the direct determination, the object dimensioning module 1106 may assign preliminary dimensions based upon the recognition of an object and retrieval of previously stored dimensional data in the object datastore 120. For example, where the object is recognized as a beverage can 626, the dimensions of a beverage can which have been previously stored in the object datastore 120 may be assigned to object to produce preliminary dimensions. These preliminary dimensions may then be used as described above to apply tentative dimensions to other objects.

Where dimensioning is based upon information from the object datastore 120, the assumed dimensions may not be entirely accurate. For example, most beverage cans have a particular size and diameter, but some differ. As a result, the preliminary assumptions may be incorrect. As above, the preliminary dimensions may be tested and invalid dimensions discarded. For example, the dimensions of the beverage can 626 may be compared with the dimensions of an electrical outlet 618. While each of these objects may have slightly different measurements, by testing one set of dimensions against another, errors may be reduced or eliminated. By testing a sufficient number of assumptions and dimensions and discarding unlikely or contradictory dimensions, the results from these tests will converge towards actual dimensions.

In some implementations, the structured light module 1102, the object recognition module 1104, or both utilize non-structured light data to aid in dimensioning. For example, the object may be imaged and analyzed to look for text, trademarks, particular colors, watermarks, and so forth. Thus, an object with text that reads "ABC Brand Cola 12 FL. OZ" may be recognized as a standard beverage can size of ABC Brand cola. Once recognized, the dimensions of the object may then be retrieved from the object datastore 120, and used to apply preliminary dimensions.

The scene modeling module 1108 uses the topology data from the structured light module 1104, the object recognition information from the object recognition module 1104, and the object dimensioning module 1106 to build a model of the scene. This model may include the placement and identification of particular objects within a three-dimensional space. This model may then be used by the augmented reality module 122 to provide an augmented reality environment.

Figure 12:
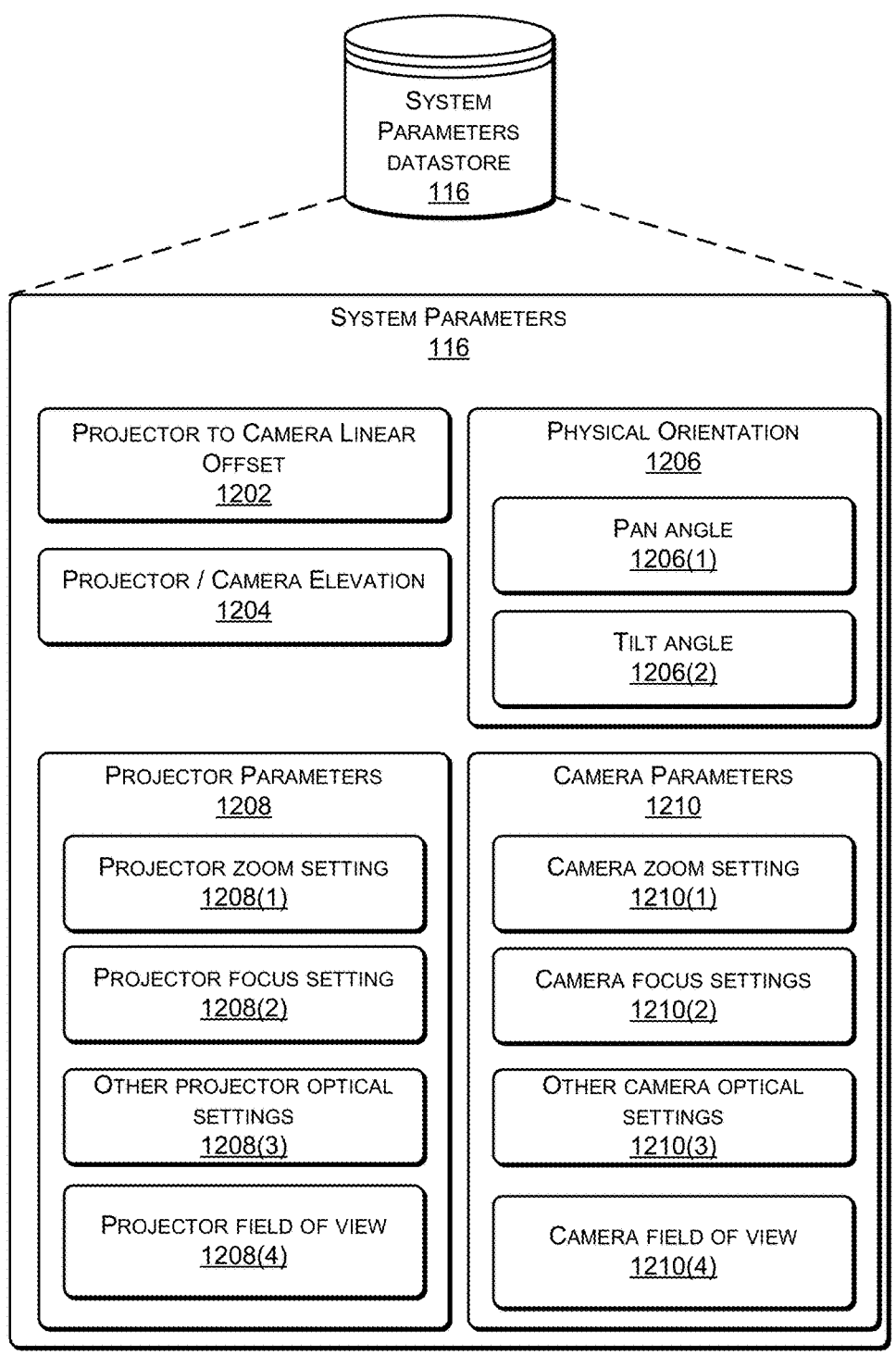
FIG. 12 illustrates a datastore of system parameters which describe the state of the augmented reality functional node and/or associated components.

FIG. 12 shows one example implementation of the system parameters datastore 116. The system parameters 116 describe the state of the ARFN 102, associated components, or both. The spatial analysis module 114 may access these parameters during operation to aid in the characterization of the scene. A projector to camera linear offset 1202 is stored, such as the distance "O" indicated in FIG. 2. This indicates the linear distance between the camera and projector. A projector/camera elevation 1204 may be stored which indicates the height of the respective devices from a fixed reference point, such as the floor. In another implementation, this may be the distance to the ceiling.

Physical orientation 1206 data provides the physical positioning of the ARFN 102, or individual components therein such as the projector 206 and the camera 210. In some implementations, the projector 206 and the camera 210 may be configured with separate actuators such that each may move independently, or track to a common point. In these implementations, the physical orientation 1208 data may include pan and tilt angles for each.

A pan angle 1206(1) may be maintained to indicate an extent of yawing of the ARFN 102 relative to a pre-determined origin. Similarly, a tilt angle 1206(2) may be maintained to indicate an extent of pitch of the ARFN 102 relative to a pre-determined origin. By utilizing the physical orientation 1206 information, the spatial analysis module 114 is able to determine how the sensors of the ARFN 102 are oriented.

A set of projector parameters 1208 are stored in the system parameters datastore 116 to describe the configuration of the projector 206. Such projector parameters may include projector zoom settings 1208(1), projector focus settings 1208(2), other projector optical settings 1208(3), and a projector field of view 1208(4). This latter parameter indicates the projector field of view 208 at a given point in time. This field of view may change with variations in projector configuration during operation.

Camera parameters 1210 may also be maintained in the datastore 116 to describe the configuration of the camera 210. These may include camera zoom setting 1210(1), camera focus setting 1210(2), and other camera optical settings 1210(3). A camera field of view 1210(4) such as the camera field of view 212 may also be maintained. This field of view may change with variations in camera configuration during operation.

Figure 13:
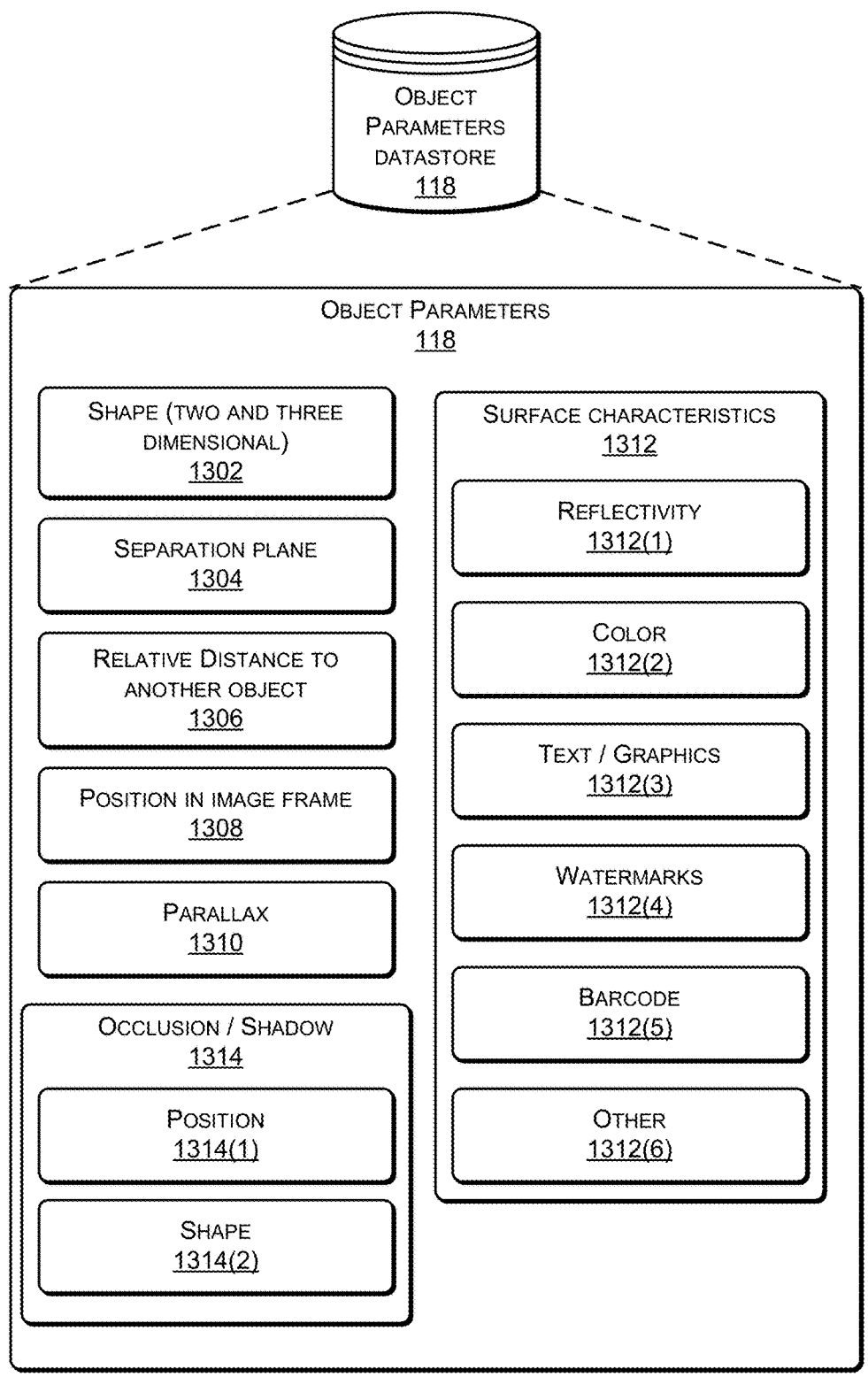
FIG. 13 illustrates a datastore of object parameters which describe the state of an object within the augmented reality environment.

FIG. 13 illustrates one implementation of the object parameters datastore 118, in which data is used to describe the state of a physical object within the scene. These object parameters may include a shape 1302 of the object. The shape 1302 describes the physical topology of the object in two or more dimensions. For example, the shape may indicate that the object has a rectangular two-dimensional silhouette, a cylindrical topology, or both. A separation plane 1304 may indicate where the object is considered to be separate from another object. For example, the separation plane 1304 may designate a boundary between the beverage can 626 and the table 624.

A relative distance to another object 1306 may be maintained in the datastore 118. The relative distance 1306 indicates whether the object of interest is closer to or farther from the ARFN 102 than another object. A position of the object in an image frame 1308 may also be maintained. For example, as the ARFN 102 pans, the object may appear to move in the image frames, such as described above with regards to FIG. 8-10. Similarly, the parallax 1310 or apparent displacement of the object between images acquired from different physical positions may be included as one of the object parameters.

Surface characteristics 1312 of the object may also be maintained in the datastore 118. These surface characteristics may be acquired through imaging of visible and/or non-visible light, interaction with sound both audible and ultrasonic, radar, and so forth. Reflectivity 1312(1) of the object to pre-defined light wavelengths may be maintained. Color 1312(2) of an object may be maintained. In one implementation, the color 1312(2) of the object may be determined by analyzing imperceptible structured light in which the modulated image property is chrominance. Text/graphics 1312(3) on the object may be imaged, recognized, and stored. Watermarks 1312(4) both visible and non-visible may be stored in the object parameters 118 datastore. Machine readable tags such as barcodes 1312(5) associated with the object, such as a universal product code (UPC), shipping tag, stock-keeping unit (51(U), and so forth may also be stored in the object parameters 118 datastore. Other surface characteristics 1312(6) may also be stored. For example, surface texture, reflectivity to sound, composition, and so forth.

The object parameters 118 may also include data on the object's interaction with light such as ambient light, the structured light pattern 302, or both. Details about occlusions or shadows 1314 created by the object may be stored. These details may include the position 1314(1) of the shadow and the shape 1314(2) of the shadow. This information may be used as described above with regards to FIGS. 8-10 to determine placement, distance, and so forth.

The spatial analysis module 114 may use these parameters to characterize the scene. For example, the relative distance to another object 1306 may be used to setup an initial set of dimensional assumptions for testing. Or the particular name on a beverage can may be used to identify the beverage can and the physical dimensions associated with it.

FIG. 14 illustrates one or more implementations of the object datastore 120 containing information about known objects. The object datastore 120 may reside on a device such as the ARFN 102, a storage device on the local area network accessible to the ARFN 102, within a cloud resource accessible via a wide-area network, or be distributed across a combination thereof.

The fields within this datastore include a first field 1402 naming an object, a second field 1404 describing the width of the object, a third field 1406 describing the height of the object, a fourth field 1408 describing the width of the object, a fifth field 1410 describing a shape of the object, and a sixth field 1412 describing environmental assumptions associated with the object. These fields are shown for illustration, and not by way of limitation. In other implementations some of these fields may be omitted, while other fields not specified here such as universal product code (UPC) barcodes may be added. In some implementations the object parameters datastore 118 may be incorporated into the object datastore 120.

The object datastore 120 provides information about known objects to the spatial analysis module 114 and other modules. For example, a beverage can object 1402 is shown with width 1404, height 1406, and length 1408 typical of a beverage can used in the United States and Canada. The shape 1410 is described as generally cylindrical. The environmental assumptions 1412 for this particular object are that beverage cans are not likely to be on the wall or the ceiling. Thus a cylindrical object without a shelf or other apparent means of support such as a hand of the user 602 is likely not a beverage can. Different objects may have different assumptions. For example, light switches are assumed to be found on walls. These assumptions may be used to characterize objects within the scene for identification, dimensioning, and so forth by the spatial analysis module 114.

The objects in the object datastore 120 may be specific, for example a particular make and model of bar stool, or more generic, such as bar stools generally having a particular configuration and attributes. The object datastore 120 may be pre-loaded with known objects before use by the user 602, built by the user 602, or a combination thereof. For example, after initial installation and characterization, the chair 620 may be stored as a known object for future reference. Known objects may also include people, animals, or any other tangible item which may be in the scene.

The user may interrogate the object datastore 120 during interactions within the augmented reality environment. For example, the user may request a particular item be identified, request an inventory of objects within the scene, request a location of a particular item, and so forth.

Illustrative Spatial Analysis Processes

Figure 15:
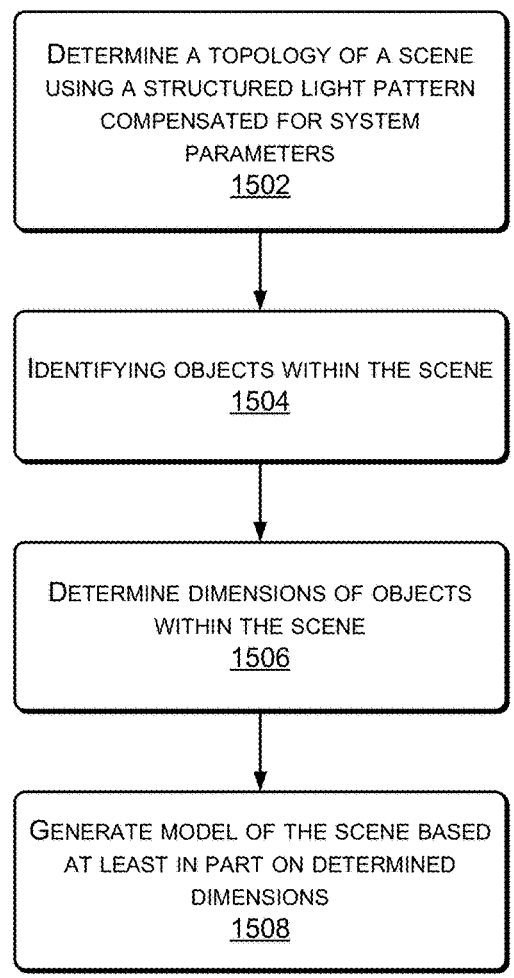
FIG. 15 is an illustrative process of generating a model of a scene in an augmented reality environment.

FIG. 15 illustrates an overall process 1500 of generating a model of a scene. In one implementation, the process 1500 may be carried out by the spatial analysis module 114. As described above, this model may be used by the augmented reality module 122 to provide augmented reality to the user.

At 1502, a topology of a scene is determined using a structured light pattern compensating for system parameters such as in the system parameters datastore 116. For example, the structured light pattern 302 may be imaged by the camera 210 to recover structured light data. The structured light data may be adjusted to compensate for system parameters such as pan, tilt, zoom, and so forth. The determination of the topology of the scene is described in more depth below with regards to FIGS. 16-17.

At 1504, objects are identified within the scene. This identification may involve a comparison of object parameters 118 with known reference objects stored in the object datastore 120. For example, the beverage can 626 may be identified based upon its shape, size, and text thereon. The identification of objects is described in more depth below with regards to FIG. 18.

At 1506, dimensions of objects within the scene is determined. This determination of one or more dimensions may be direct via measurement or indirectly by testing possible dimensions against one or more assumptions. Testing may involve the application of preliminary dimensions or tentative dimensions to several objects and discarding dimensions which do not fit assumptions about the objects, the scene, or both. For example, it may be assumed that most humans are shorter than most doors. Thus, dimensions which would render the door 612 larger than the user 602 may be discarded. The determination of dimensions is described in more depth below with regards to FIGS. 19 and 20.

At 1508, a model of the scene is generated based at least in part upon the determined topology, objects, and dimensions. This model may include the objects within that scene and details such as placement in three-dimensional space, dimensions of the objects, identity of the objects, movement, and so forth. The determination of dimensions is described in more depth below with regards to FIGS. 20-21.

Figure 16:
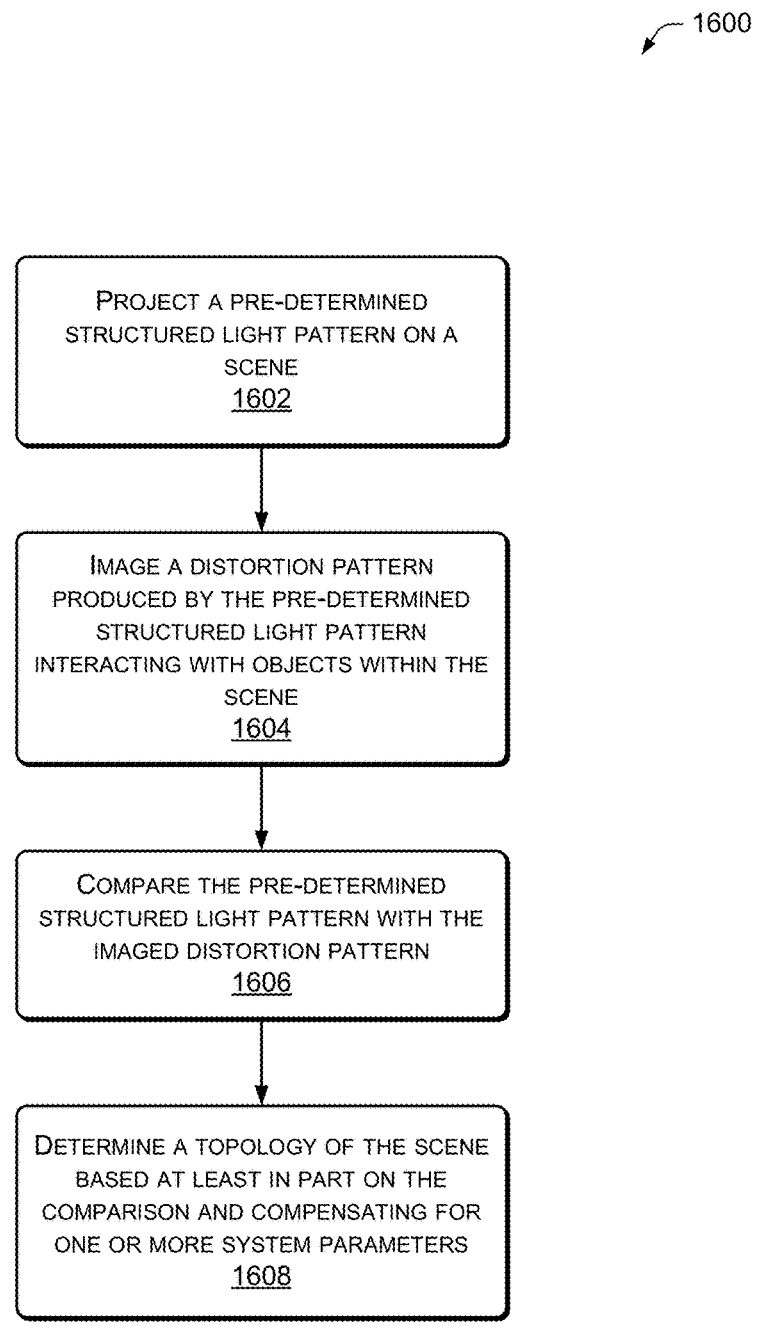
FIG. 16 is an illustrative process of determining the topology of the scene with structured light.

FIG. 16 is an illustrative process 1600 of determining the topology of the scene with structured light. In one implementation, the structured light module 1102 may carry out the process 1600. As described above with regards to FIG. 3, the general contour or shape of objects within at least a portion of the scene may be determined by using the interaction of structured light with objects in the scene.

At 1602, a pre-determined structured light pattern is projected on the scene. For example, the projector 206 may project a pseudorandom noise structured light pattern using wavelengths which are visible to the user, non-visible to the user, or a combination thereof.

At 1606, a distortion pattern produced by the interaction of the structured light pattern interacting with objects within the scene is acquired. For example, the camera 210 may capture an image of the structured light pattern showing the deformation effect 308 as shown in FIG. 3. In some implementations, the projector 206 and the camera 210 are separated from one another by a projector/camera linear distance "O".

At 1608, the pre-determined structured light pattern is compared with the imaged distortion pattern to recover structured light data. This comparison may include various image processing and compensation for system parameters 116 such as the projector to camera linear distance 1002, physical orientation 1006, and so forth.

At 1610, a topology of the scene is determined based at least in part upon the structured light data compensated by one or more of the system parameters 116. The topology may comprise a surface representation without actual dimensional data. For example, the shapes of the beverage can 626 and the television 622 may be determined, no dimensions are applied thereto.

Figure 17:
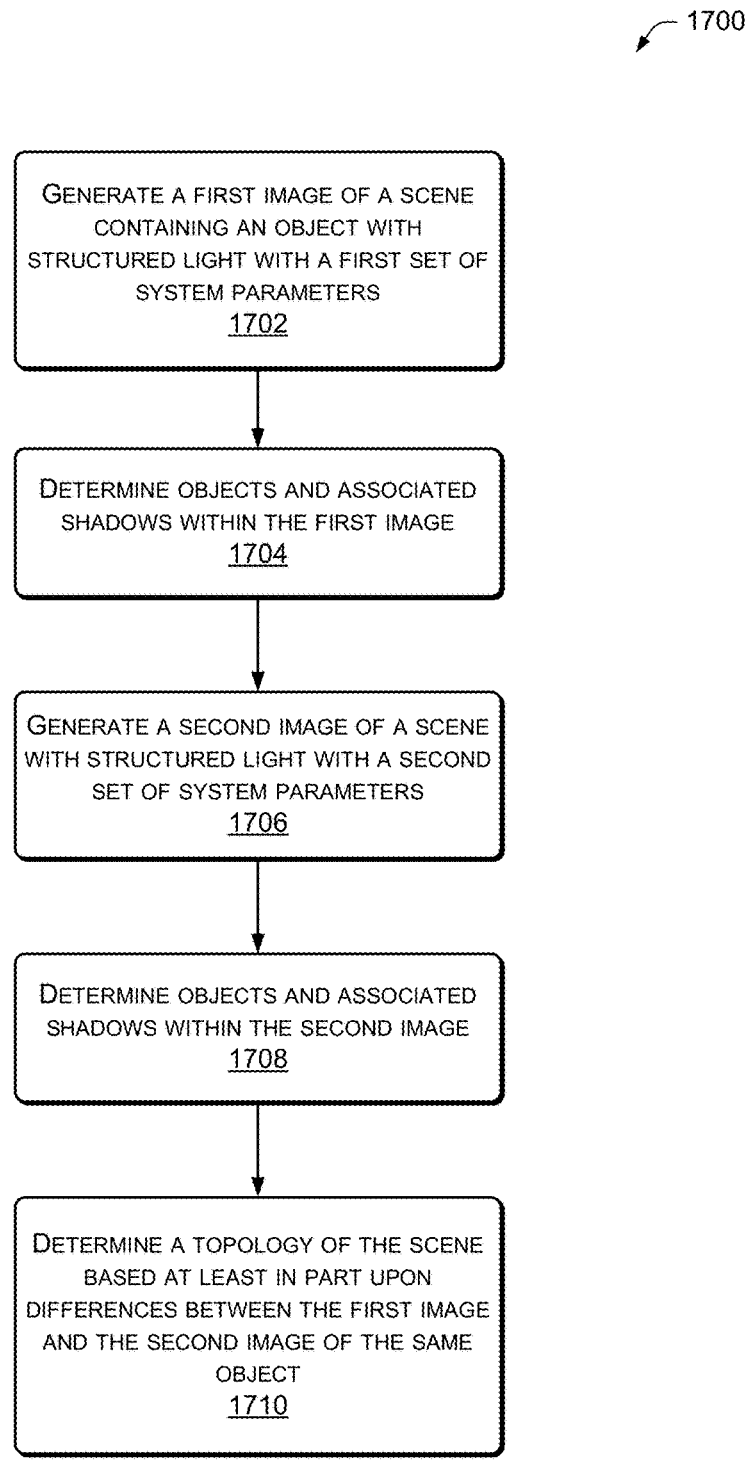
FIG. 17 is an illustrative process of using a panning augmented reality functional node to determine the topology of the scene.

FIG. 17 is an illustrative process 1700 of determining the topology of the scene when using a rotating scan head, such as the panning of the ARFN 102 across the scene. In one implementation, the structured light module 1102 may carry out the process 1700.

At 1702, a first image of the scene containing an object is generated with the structured light pattern and a first set of system parameters 116. For example, the PN structured light pattern may be projected onto the scene by projector 206 on the ARFN 102 when the pan equals zero degrees.

At 1704, objects and associated shadows within the first image are determined. For example, as discussed above with regards to FIG. 10, the size, shape, relative position, and so forth of the object in the image may be determined.

At 1706, a second image of the scene is generated with structured light and a second set of system parameters. Continuing the example, the second image may be acquired when the ARFN 102 has been panned twenty degrees. By rotating the ARFN 102, the spatial relationship between the projector 206 and the camera 210 has changed with respect to that of objects in the environment, such as shown above with regards to FIGS. 8-10.

At 1708, objects and associated shadows within the second image are determined. For example, as discussed above with regards to FIG. 10, the size, shape, relative position, and so forth of the object in the image may be determined.

At 1710, a topology of the scene based at least in part upon the differences between the first image and the second image of the same object may be determined. Thus, by changing the physical configuration, such as panning the ARFN 102 as described above with regards to FIGS. 7-10, the topology of the scene may be calculated.

Figure 18:
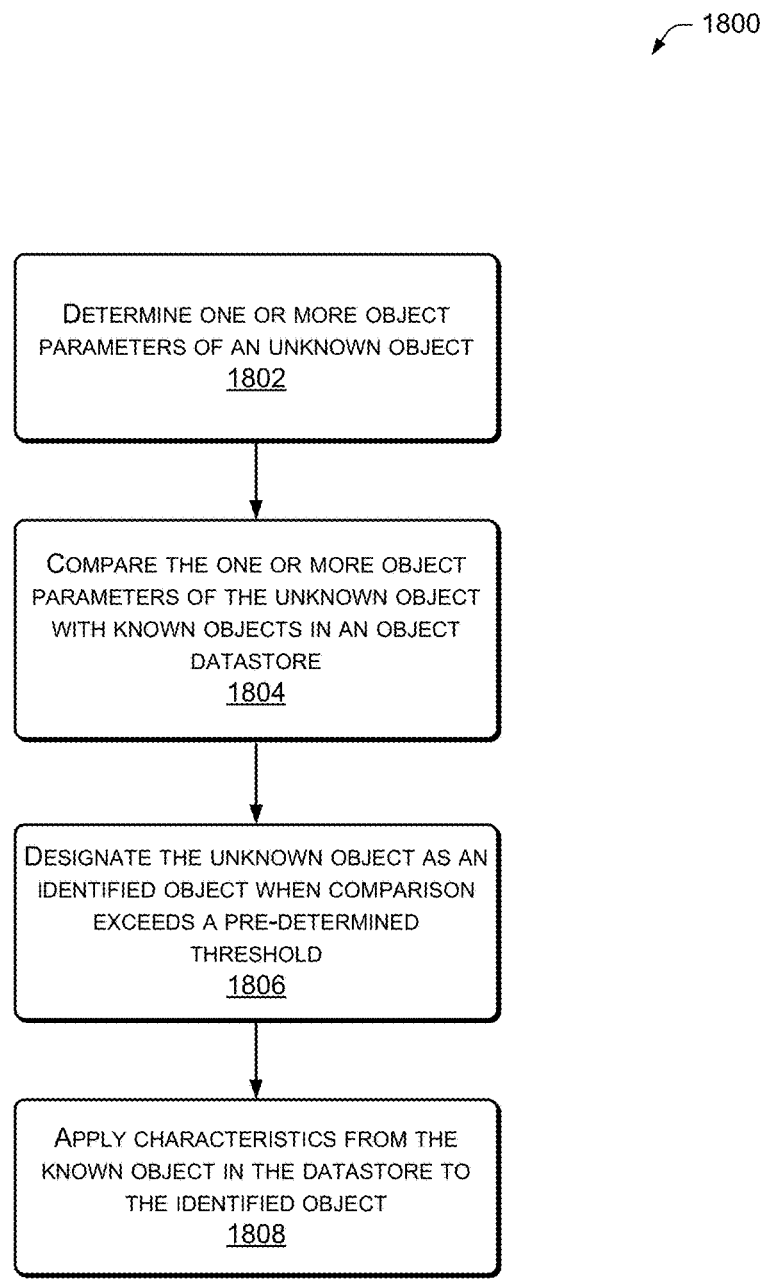
FIG. 18 is an illustrative process of recognizing objects within the scene.

FIG. 18 is an illustrative process 1800 of identifying objects within the scene. Identification of the objects may be used in some implementations to aid in dimensioning objects within the scene. In one implementation, the object recognition module 1104 may carry out the process 1600.

At 1802, one or more object parameters of an unknown object are determined. For example, the shape 1102 and the surface characteristics 1112 of the object may be determined, or a barcode may be scanned. In some implementations, the shape 1102 may be data resulting from the determination of the topology of the scene as described above.

At 1804, one or more of the object parameters 118 of the unknown object are compared with information in the object datastore 120. For example, the ratio of height to width and the topology of the unknown object may be compared to known objects to find possible matches.

At 1806, when the comparison exceeds a pre-determined threshold level of confidence, the unknown object is identified as a known object. This pre-determined threshold level of confidence may be static or dynamically adjusted. For example, the user may wish to have objects identified as a known object when the ratio of height to width of the unknown and known objects have a 95% confidence match.

At 1808, characteristics from the known object in the object datastore 120 may be applied to the identified object. For example, where the known object is identified as a beverage can, the particular physical dimensions and attributes of the beverage can may be associated therewith. As described next, this may be used to indirectly determine dimensions.

FIG. 19 is an illustrative process 1900 of determining dimensions of objects within the scene by identifying an object and applying tentative dimensions to other objects. In one implementation, the object dimensioning module 1106 may carry out the process 1900.

At 1902, preliminary dimensions are applied to an identified object based at least in part on the identification. For example, where the object is identified as a beverage can, the dimensions of the beverage can stored in the object datastore 120 may be used.

At 1904, tentative dimensions are applied to an unidentified object within a scene. These tentative dimensions may be based at least in part upon the preliminary dimensions of the identified object. For example, based upon the preliminary dimensions of the beverage can 626, tentative dimensions of the door 612 may be assigned.

At 1906, the tentative dimensions of the object is tested and contradictory dimensional results are discarded. For example, suppose the actual dimensions of the user 602 and the door 612 are unknown, and that the beverage can 626 has been identified. Because of that identification, preliminary dimensions have been determined. The object datastore 120 indicates that beverage cans 626 are smaller than both users 602 and doors 612, and that doors 612 are generally larger than users 602. Dimensions in which the door 612 is smaller than the user 602 is suspect may be discarded. However, dimensions in which the door 612 is larger than the user 602 may be retained and tested against other objects and assumptions. The testing may involve comparisons of multiple objects within the scene, allowing dimensional constraints to be refined to a point where the tested dimensions approach or achieve the actual dimensions. In some implementations the preliminary dimensions may also be tested. The testing process 1900 may be iterated to reduce errors due to the assumptions until a pre-determined error threshold is reached or exceeded.

At 1908, the preliminary dimensions and tentative dimensions may be confirmed as actual dimensions when errors associated with the tentative dimensions, the preliminary dimensions, or both are reduced below the pre-determined error threshold. For example, the preliminary dimensions of the beverage can 626 may be estimated as being accurate to within about 5% when tested against other objects. When the pre-determined error threshold is configured such that 10% or better accuracy is sufficient, the dimensions of the beverage can 626 may be deemed actual.

FIG. 20 is an illustrative process 2000 of another implementation of to determining dimensions of objects within the scene. In this implementation, the tentative dimensioning accomplished without prior identification of the objects therein. In one implementation, the object dimensioning module 1106 may carry out the process 2000.

At 2002, preliminary dimensions are applied to one or more dimensioned objects in a scene based at least in part upon the determined topology of the scene. This may also include direct measurements such as described in FIGS. 8-10.

At 2004, tentative dimensions are applied to one or more undimensioned objects within the scene based at least in part upon the preliminary dimensions and a relative position of the dimensioned objects to the undimensioned objects. The determined topology may indicate that object "A" is closer to the ARFN 102 than object "B". If object A was directly measured such that preliminary dimensions are applied, and given the displacement and relative position of object B, the dimensions of object B may be determined.

At 2006, the preliminary dimensions of the one or more dimensioned objects and the tentative dimensions of the one or more undimensioned objects are tested and contradictory dimensional results are discarded. As above, different assumptions about the scene and the objects in the scene may be made, with the assumptions used to constrain the possible dimensions of the objects.

At 2008, the preliminary and tentative dimensions are confirmed as actual dimensions when errors associated with the tentative dimensions, the preliminary dimensions, or both are reduced below the pre-determined error threshold. Furthermore, as above, the process may be iterated to reach a desired minimum error level.

Figure 21:
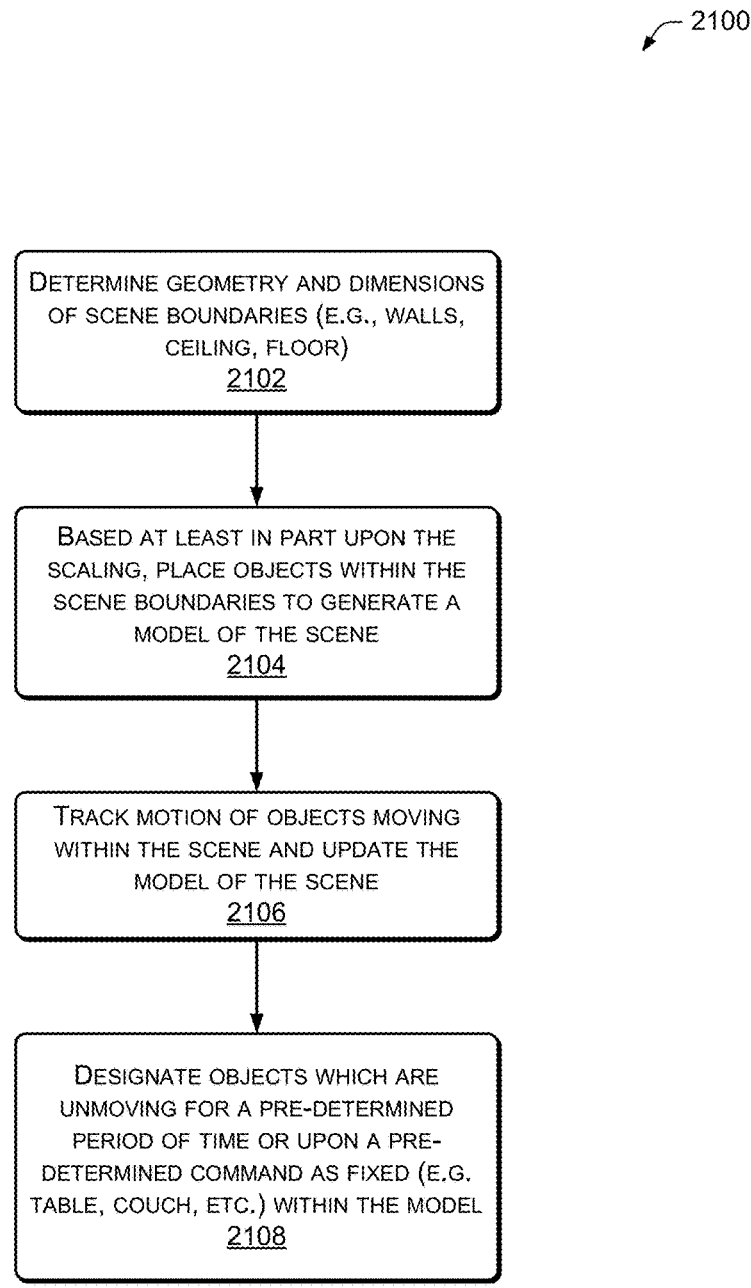
FIG. 21 is an illustrative process of generating a model of the scene based at least in part on the determined dimensions.

FIG. 21 is an illustrative process 2100 of generating a model of the scene based at least in part on the determined dimensions. In one implementation, the scene modeling module 1108 may carry out the process 2100.

At 2102, the geometry and dimensions of the scene boundary are determined. For example, the size of walls 604, ceiling 608 height, and so forth may be calculated.

At 2104, based at least in part upon the dimensions, placing objects within the scene boundaries to generate a model of the scene. This fills in the model of the scene to match the actuality.

At 2106, moving objects within the scene are tracked and the model of the scene is updated. For example, a user may move a couch or roll a chair to a new position. This motion is tracked and a proper location in the model for the object which corresponds to the actual physical location is maintained.

At 2108, objects which are unmoving for a pre-determined period of time or upon a pre-determined command are designated as fixed objects within the model. These fixed objects may include walls, windows, doors, and so forth. Once determined as unmoving, they may become known objects and used to provide a dimensional reference point to other objects in the scene.

Illustrative Scenario of Spatial Analysis

Figure 22:
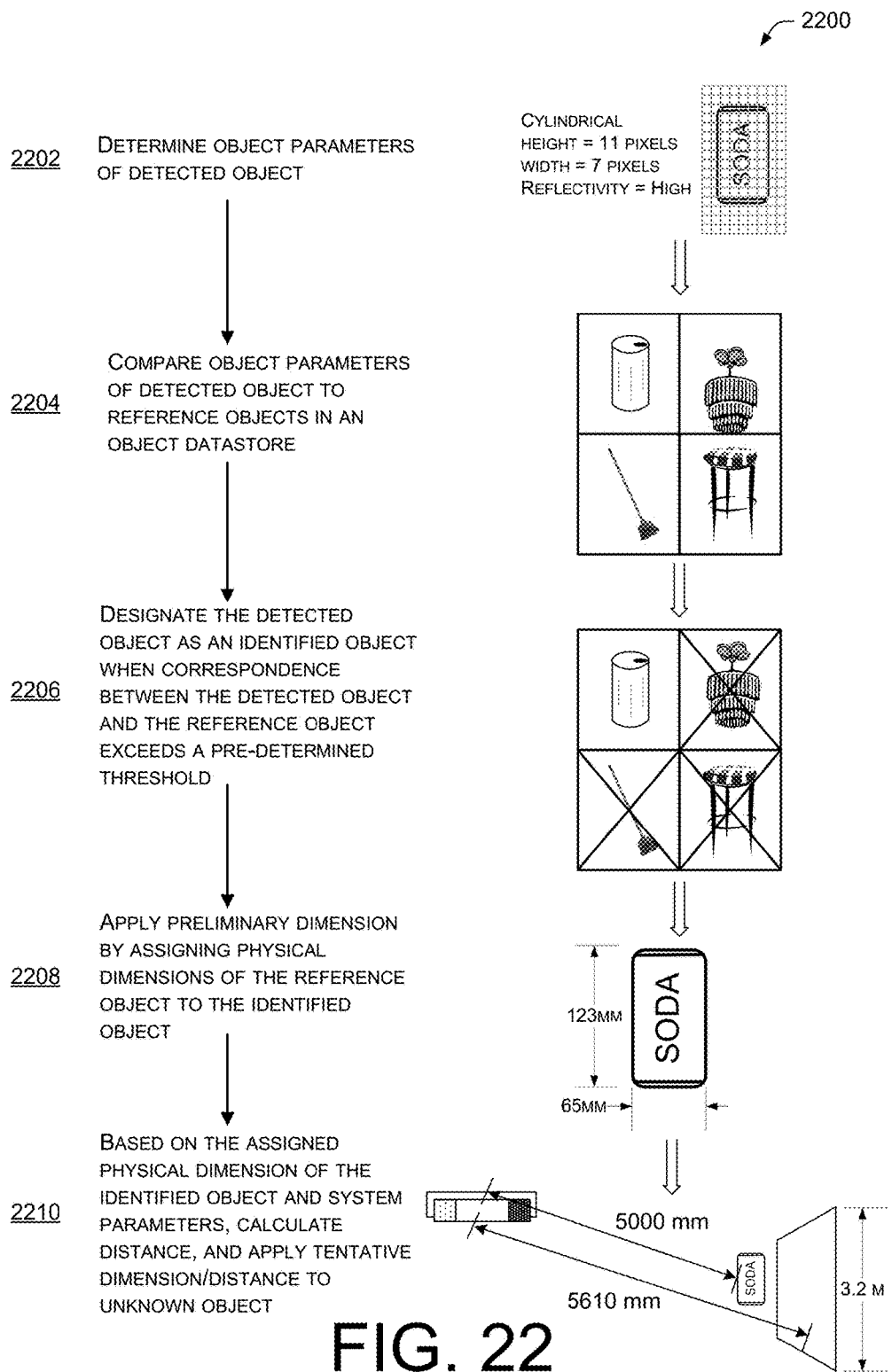
FIG. 22 is an illustrative process of identifying an object and applying tentative dimensions to an unknown object.

FIG. 22 is an illustrative scenario 2200 of identifying an object and applying tentative dimensions to an unknown object. Operation 2202 demonstrates how the spatial analysis module 114 determines object parameters 118 of a detected object. In this illustration, a beverage can is detected and associated parameters are ascertained.

Operation 2204 shows a comparison of object parameters 118 of the detected object to reference objects already maintained in the object datastore 120. For example, as shown here, cylindrical objects such as a beverage can, broom, chandelier, and stool all may possess one or more features that may be considered similar to those of the detected object, and hence these objects may be considered as potential matches.

Operation 2206 designates the detected object as an identified object when a correspondence between the detected object and the reference object exceeds a pre-determined error threshold. For example, when the overall shape, aspect ratio, and so forth of the detected object are within a 95% confidence match of the known beverage can, the object is identified as a beverage can. Other confidence thresholds and techniques may be employed.

Operation 2208 applies preliminary dimensions by assigning physical dimensions of the reference object to the identified object. Continuing our example, the beverage can has preliminary dimensions of a height of 123 mm and diameter of 65 mm based on the data in the object datastore 120.

Operation 2210 calculates a distance and applies tentative dimensions to an unknown object based at least in part on the assigned physical dimensions of the identified object. For example, given the beverage can has a height of 123 mm, the structured light data places the beverage can at 5000 mm from the ARFN 102. Given that measurement and the structured light data on the wall, the wall is determined to be 5612 mm from the ARFN 102.

CONCLUSION

Although the subject matter has been described in language specific to structural features, it is to be understood that the subject matter defined in the appended claims is not necessarily limited to the specific features or operations described. Rather, the specific features or operations are disclosed as illustrative forms of implementing the claims.

What is claimed is:

1. A system comprising:
   one or more processors; and
   one or more non-transitory computer-readable media storing instructions executable by the one or more processors, wherein the instructions program the one or more processors to implement a service to:
   project a pre-determined structured light pattern onto a scene;
   acquire a distortion pattern produced by the pre-determined structured light pattern interacting with one or more objects within the scene;
   compare the distortion pattern with the pre-determined structured light pattern to determine structured light data;
   determine a topology of the scene based on the structured light data, the topology being a surface representation of the scene including depth of field data;
   determine one or more object parameters of an object of the one or more objects;
   identify the object based on the topology of the scene by comparing the one or more object parameters to dimensional data about one or more known objects;
   determine one or more preliminary dimensions of the object based at least in part upon identifying the object;
   determine a plurality of tentative dimensions of an unidentified object of the one or more objects based at least in part upon the one or more preliminary dimensions and one or more relative positions of the object and the unidentified object, the plurality of tentative dimensions including a first tentative dimension of the unidentified object and a second tentative dimension of the unidentified object that is different from the first tentative dimension;
   perform a test of the plurality of tentative dimensions against a pre-determined set of assumptions about at least one known object of the one or more known objects;
   discard the first tentative dimension based on a result of the test contradicting the pre-determined set of assumptions; and
   determine the second tentative dimension and a particular preliminary dimension of the one or more preliminary dimensions as final dimensions based at least in part on a determination that an error associated with the particular preliminary dimension and the particular tentative dimension is below a pre-determined error threshold value.

2. The system as recited in claim 1, wherein the one or more object parameters include one or more of:
   a shape of at least one object of the one or more objects;
   a dimension of at least one object of the one or more objects;
   an identifying marking of at least one object of the one or more objects; and
   a reflectivity of at least one object of the one or more objects.

3. The system as recited in claim 1, wherein the pre-determined set of assumptions comprise a pre-determined set of rules describing behavior of physical objects including a particular assumption comprising a relation of a first magnitude of a first dimension of a first known object relative to a second magnitude of a second dimension of a second known object, and wherein the test comprises:
   determining that a third magnitude of the first tentative dimension relative to a fourth magnitude of a third dimension of a particular identified object does not match the relation of the particular assumption; and
   determining that a fifth magnitude of the second tentative dimension relative to the fourth magnitude of the third dimension of the particular identified object does match the relation of the particular assumption.

4. The system as recited in claim 1, wherein the pre-determined set of assumptions comprise a pre-determined set of rules describing behavior of physical objects including an assumption regarding a first location within a physical environment where a first known object is unexpected to reside and a second location within the physical environment where the first known object is expected to reside, and wherein the test comprises:
   determining a first tentative position of the unidentified object based at least in part on a first determination that the first tentative dimension is one of the final dimensions;
   determining that the first tentative position of the unidentified object matches the first location within the physical environment;
   determining a second tentative position of the unidentified object based at least in part on a second determination that the second tentative dimension is one of the final dimensions; and
   determining that the second tentative position of the unidentified object matches the second location within the physical environment.

5. One or more non-transitory computer-readable storage media storing computer-executable instructions that, when executed, cause one or more processors to:
   identify one or more objects within a scene based on a topology of the scene;

determine a preliminary dimension of the one or more objects within the scene;
determine a tentative dimension of one or more unidentified objects within the scene based at least in part upon the preliminary dimension of the one or more objects and one or more relative positions of the one or more objects and the one or more unidentified objects;
perform a test of the tentative dimension against a pre-determined set of assumptions; and
determine the tentative dimension and the preliminary dimension as final dimensions based at least in part on a determination that the preliminary dimension and the tentative dimension are within a pre-determined error threshold value.

6. The one or more non-transitory computer-readable storage media of claim 5, wherein the identifying of the one or more objects within the scene comprises:
determining one or more object parameters of objects within the scene; and
identifying the one or more objects by comparing the one or more object parameters to data about one or more known objects.

7. The one or more non-transitory computer-readable storage media of claim 5, wherein object parameters associated with an object of the one or more objects include one or more of:
a shape of the object;
one or more dimensions of the object;
one or more identifying markings of the object; and
a reflectivity of the object.

8. The one or more non-transitory computer-readable storage media of claim 7, wherein the instructions, when executed, further cause the one or more processors to project a pre-determined structured light pattern onto the scene, wherein projecting the pre-determined structured light pattern onto the scene comprises:
embedding the pre-determined structured light pattern within a plurality of visible light sub-frames such that the plurality of visible light sub-frames contain a set of opposing excursions in one or more image properties, wherein the set of opposing excursions are deviations from image properties of base frames corresponding to the plurality of visible light sub-frames and wherein the set of opposing excursions vary between pluralities of visible light sub-frames corresponding to at least two different base frames; and
projecting the plurality of visible light sub-frames onto the scene.

9. The one or more non-transitory computer-readable storage media of claim 5, wherein the topology comprises a surface representation of the scene including depth information.

10. The one or more non-transitory computer-readable storage media of claim 5, the instructions, when executed, further causing the one or more processors to:
generate a spatial model of the scene based at least in part upon the topology and the final dimensions, wherein the spatial model includes relative locations and final dimensions of the one or more objects and the one or more unidentified objects within a three-dimensional spatial representation of the scene.

11. The one or more non-transitory computer-readable storage media of claim 5, wherein the pre-determined set of assumptions comprise a pre-determined set of rules describing behavior of physical objects including a particular assumption comprising a relation of a first magnitude of a first dimension of a first known object relative to a second magnitude of a second dimension of a second known object, and wherein the test comprises:
determining whether a third magnitude of the tentative dimension relative to a fourth magnitude of a third dimension of a particular identified object matches the relation of the particular assumption.

12. The one or more non-transitory computer-readable storage media of claim 5, wherein the pre-determined set of assumptions comprise a pre-determined set of rules describing behavior of physical objects including an assumption regarding a location within a physical environment where a first known object is expected or unexpected to reside, and wherein the test comprises:
determining a tentative position of a particular unidentified object of the one or more unidentified objects based at least in part on a determination that the first tentative dimension is one of the final dimensions of the particular unidentified object; and
determining whether the tentative position of the particular unidentified object matches the first location.

13. The one or more non-transitory computer-readable storage media of claim 5, the instructions, when executed, further causing the one or more processors to:
performing a second test of second tentative dimension of the one or more unidentified objects against the pre-determined set of assumptions; and
discard the second tentative dimension based on a contradictory dimensional result generated from the second test of the second tentative dimension.

14. A method comprising:
identifying one or more objects within a scene based on a topology of the scene;
determining a preliminary dimension of an object of the one or more objects;
determining a tentative dimension of an undimensioned object within the scene based at least in part upon the preliminary dimension of the object;
testing the preliminary dimension of the object against a pre-determined set of assumptions about the one or more objects; and
determining the tentative dimension and the preliminary dimension as final dimensions based at least in part on a determination that the preliminary dimension and the tentative dimension are within a pre-determined error threshold value.

15. The method of claim 14, further comprising:
testing a second preliminary dimension of the object against the pre-determined set of assumptions; and
discarding the second preliminary dimension based on a contradictory dimensional result generated from the testing of the second preliminary dimension.

16. The method of claim 14, further comprising:
testing the tentative dimension of the one or more objects against a second pre-determined set of assumptions about the undimensioned object;
testing a second tentative dimension of the undimensioned object against the second pre-determined set of assumptions; and
discarding the second tentative dimension based on a contradictory dimensional result generated from the testing of the second tentative dimension.

17. The method of claim 14, wherein identifying the one or more objects within the scene comprises:
determining one or more object parameters of the one or more objects; and identifying the one or more objects by comparing the one or more object parameters to data about one or more known objects.

18. The method of claim 14, further comprising determining one or more object parameters of the object, wherein the one or more object parameters include one or more of:
   a shape of the object;
   one or more dimensions of the object;
   one or more identifying markings of the object; and
   a reflectivity of the object.

19. The method of claim 14, wherein the pre-determined set of assumptions comprise a pre-determined set of rules describing behavior of physical objects including a particular assumption comprising a relation of a first magnitude of a first dimension of a first known object relative to a second magnitude of a second dimension of a second known object, and wherein testing comprises:
   determining whether a third magnitude of the tentative dimension relative to a fourth magnitude of a dimension of a particular dimensioned object matches the relation of the particular assumption.

20. The method of claim 19, wherein the pre-determined set of assumptions comprise a pre-determined set of rules describing behavior of physical objects including an assumption regarding a location within a physical environment where a first known object is expected or unexpected to reside, and wherein the testing comprises:
   determining a tentative position of a particular undimensioned object based at least in part on a determination that the tentative dimension is one of the final dimensions; and
   determining whether the tentative position of the particular undimensioned object matches the location.

* * * * *